US 12,059,848 B2

(12) United States Patent
Sáez López et al.

(10) Patent No.: US 12,059,848 B2
(45) Date of Patent: Aug. 13, 2024

(54) PRODUCTION OF COLLAPSIBLE POUCHES HAVING A FITMENT

(71) Applicant: SIG SERVICES AG, Neuhausen am Rheinfall (NL)

(72) Inventors: Abel Sáez López, Barcelona (ES); Laurens Last, Tilburg (NL); Johannes Wilhelmus Van Tuil, Barcelona (ES); Jordi Canada Codina, Barcelona (ES); Jordi Vidal Camps, Barcelona (ES); Juan Rojas Segura, Barcelona (ES)

(73) Assignee: SIG SERVICES AG, Neuhausen am Rheinfall (CH)

( * ) Notice: Subject to any disclaimer, the term of this patent is extended or adjusted under 35 U.S.C. 154(b) by 167 days.

(21) Appl. No.: 17/626,451

(22) PCT Filed: Jul. 28, 2020

(86) PCT No.: PCT/EP2020/071308
§ 371 (c)(1),
(2) Date: Jan. 11, 2022

(87) PCT Pub. No.: WO2021/018915
PCT Pub. Date: Feb. 4, 2021

(65) Prior Publication Data
US 2022/0242054 A1 Aug. 4, 2022

(30) Foreign Application Priority Data
Jul. 29, 2019 (NL) .................................. 2023583

(51) Int. Cl.
*B29C 65/32* (2006.01)
*B29C 65/00* (2006.01)
(Continued)

(52) U.S. Cl.
CPC .............. *B29C 65/32* (2013.01); *B29C 65/20* (2013.01); *B29C 65/38* (2013.01); *B29C 65/745* (2013.01);
(Continued)

(58) Field of Classification Search
None
See application file for complete search history.

(56) References Cited

U.S. PATENT DOCUMENTS 3,462,336 A * 8/1969 Leatherman ...... B29C 66/81871
156/272.4

FOREIGN PATENT DOCUMENTS

CN 106232327 A 12/2016
EP 0628399 A2 12/1994
(Continued)

OTHER PUBLICATIONS

Netherlands Search Report and Written Opinion dated Feb. 11, 2020, corresponding to Application No. NL 2023223.
(Continued)

*Primary Examiner* — Barbara J Musser
(74) *Attorney, Agent, or Firm* — The Watson IP Group, PLC; Jovan N. Jovanovic

(57) ABSTRACT

A production machine for the production of collapsible pouches having a fitment. The machine has a fitment sealing station with an impulse sealing device comprising a first jaw and a second jaw and with an actuator device configured to move the first and second jaws relative to one another between an opened position and a clamped position, as well as a cooling device configured to cool each of the first and second jaws. The fitment sealing station is configured to perform an impulse sealing cycle.

24 Claims, 11 Drawing Sheets

(51) Int. Cl.
  *B29C 65/20*   (2006.01)
  *B29C 65/38*   (2006.01)
  *B29C 65/74*   (2006.01)
  *B29C 65/78*   (2006.01)
  *B29L 31/00*   (2006.01)

(52) U.S. Cl.
  CPC ...... *B29C 65/7841* (2013.01); *B29C 66/0044* (2013.01); *B29C 66/1122* (2013.01); *B29C 66/133* (2013.01); *B29C 66/3494* (2013.01); *B29C 66/4312* (2013.01); *B29C 66/53262* (2013.01); *B29C 66/81431* (2013.01); *B29C 66/4322* (2013.01); *B29C 66/91651* (2013.01); *B29L 2031/7128* (2013.01)

(56) References Cited

FOREIGN PATENT DOCUMENTS

| | | | |
|---|---|---|---|
| GB | 2566476 A | | 3/2019 |
| JP | S62-261423 A | | 11/1987 |
| JP | H06-320644 A | | 11/1994 |
| JP | H07156272 A | * | 6/1995 |
| JP | H09-2427 A | | 1/1997 |

OTHER PUBLICATIONS

International Search Report and Written Opinion dated Aug. 27, 2020, corresponding to Application No. PCT/EP2020/064633.

* cited by examiner

PRODUCTION OF COLLAPSIBLE POUCHES HAVING A FITMENT

A first aspect of the present invention relates to the production of collapsible pouches having a fitment, e.g. spouted collapsible pouches.

For the production of spouted collapsible pouches, it is known to make use of a production machine having a spout sealing station that is configured to heat seal a plastic spout having an attachment portion in a non-bonded edge region between opposed first and second walls made from heat-sealable film material.

In a well-known embodiment, the spout sealing station comprises a sealing device with a first jaw and a second jaw and with an actuator device configured to move the first and second jaws relative to one another between an opened position and a clamped position. In this sealing device, each of the jaws has a contoured front surface configured to contact the edge region of a respective wall. These contoured front surfaces each have a recessed face portion defining a recess configured to receive therein a half of the attachment portion of the spout. The contoured front surfaces of the jaws further each define, on opposite sides of the respective recessed face and adjoining said recessed face, coplanar face portions. The jaws of the sealing device are continuously heated, e.g. electrically, to a temperature suited for heat sealing. This is known as the hot-bar sealing technique. In operation, the spout is positioned, by means of a spout inserter device of the production machine, with the attachment portion thereof in the non-bonded edge region, between the opposed first and second walls that are made from heat-sealable film material. The continuously heated jaws are then moved into the clamped position. The maximum temperature of the heated jaws is generally limited by the characteristics of the film material of the pouch. Therefore, time, pressure, and temperature are the main parameters that govern this heat sealing process. The pressure is commonly rather significant to effect a proper sealing.

In view of the conditions during this common practice type of heat sealing of the spout into the non-bonded edge region, numerous developments have been made over the years to enhance the continuously heated jaws sealing process and improve the quality of the resulting joint. For example, US2007205202 discloses a molded plastic spout having an attachment portion with a central tubular portion that delimits a section of the product passage and with parallel planar weld ribs, extending in vertically spaced apart planes that are perpendicular to the central tubular portion. Vertical partition walls protrude diametrically from the central tubular portion and perpendicular to the planar weld ribs. At their perimeter each of these weld ribs may be provided with an integrally molded thin weld burr, that melts rapidly in a heat sealing process with heated jaws. The result is a heat sealing onto the attachment portion along parallel joint lines. Another example is US2014110433 wherein the heat sealing faces of the attachment portion of the molded plastic spout are provided with a relief structure, e.g. undulating ridges and furrows, with a height of about 0.1 to 0.5 millimeters above the main surface.

In the field of pouch production, it is also known to make use of an impulse sealing device, such as offered by ROPEX Industrie-Elektronik GmbH, Bietigheim-Bissingen, Germany. In known embodiments of such an impulse sealing device, at least one of the jaws has a single, elongated, impulse heatable resistor band that extends along the front surface of the jaw and is covered by a heat-resistant non-stick covering, e.g. a Teflon tape. The device is configured to perform an impulse sealing cycle, wherein the actuator device is configured to bring the first and second jaws into the clamped position, e.g. with two walls of heat sealable film material in between. The sealing device is configured to, in the clamped position, temporarily pass an electric current through the resistor band so as to generate an impulse of heat that is emitted by the resistor band. This brief impulse of heat seals the walls onto each other. The jaw cools down after termination of the energizing of the resistor band, assisted therein by operation of the associated cooling device. The actuator device is configured to move the first and second jaws into the opened position after the cooling down has been achieved. The temperature of the resistor band may in practical embodiments increase from room temperature or a slightly elevate temperature extremely fast to 300° C. or thereabout, so in general very fast to a very high temperature which is maintained only for a very short duration. The impulse sealing approach is for instance discussed in DE19737471.

The first aspect of present invention aims to provide measures that provide an improved impulse sealing that is employed in the production of collapsible pouches having a fitment, e.g. spouted collapsible pouches.

The first aspect of the present invention aims to provide measures that enhance the quality of the seal that is obtained between the attachment portion of the fitment and the film material.

The first aspect of the invention provides a production machine for the production of collapsible pouches having a fitment, e.g. a spout, said pouches each having walls made from heat-sealable film material, preferably metal-free heat-sealable film material, wherein the production machine comprises a spout sealing station that is configured to heat seal a plastic fitment having an attachment portion in a non-bonded edge region between opposed first and second walls made from heat-sealable film material, wherein the non-bonded edge region has a length and a height, wherein the fitment sealing station comprises:

- an impulse sealing device comprising a first jaw and a second jaw,
- an actuator device configured to move the first and second jaws relative to one another between an opened position and a clamped position,
- a cooling device configured to cool each of the first and second jaws, wherein the first jaw has a first contoured front surface configured to contact the edge region of a respective first wall of the pouch, wherein the second jaw has a second contoured front surface configured to contact the edge region of a respective second wall of the pouch, wherein the first and second contoured front surfaces each have a recessed face portion defining a recess configured to receive therein a half of the attachment portion of the fitment, and wherein the first and second contoured front surfaces each define, on opposite sides of the respective recessed face and adjoining said recessed face, coplanar face portions, wherein each of the first and second jaws comprises at the respective contoured front surface thereof at least one, e.g. a single elongated, impulse heatable member that extends along the recessed face portion and the coplanar face portions of the respective front surface and that is covered by a heat-resistant non-stick covering, wherein the production machine is configured such that, in operation, the fitment is positioned with the attachment portion thereof in the non-bonded edge region, between the opposed first and second walls made from heat-sealable film material, and wherein the fitment sealing station is configured to perform an impulse sealing cycle, wherein the actuator device is configured to bring the first and second jaws into the clamped position, so that—in the edge region—the first and second walls are clamped against the attachment portion of the fitment by the recessed faces of the first and second jaws and so that—in the edge region—the first and second walls on opposite sides of the fitment are clamped against one another by the coplanar faces of the first and second jaws, and wherein the fitment sealing station is configured to, in the clamped position, temporarily energize the impulse heatable members so as to generate an impulse of heat that is emitted by each of the impulse heatable members, which impulses of heat seal the edge region of the first and second walls to the attachment portion of the fitment and to each other on opposite sides of the attachment portion, wherein the first and second jaws, at least the impulse heatable members thereof, cool down after termination of the energizing assisted therein by operation of the cooling device, and wherein the actuator device is configured to move the first and second jaws into the opened position after the impulse heatable members have cooled down, wherein each impulse heatable member is a susceptor element comprising electrically conductive material, said susceptor element having a rear side facing away from the respective contoured front surface, and wherein each of the first and second jaws comprises an inductor which is electrically insulated from the respective susceptor element, wherein the inductor comprises an elongated inductor section that extends along the respective contoured front surface at the rear side of the respective at least one susceptor element, and wherein the fitment sealing station comprises a high frequency electric current source, which is connected to the inductor of each of the first and second jaws, wherein the fitment sealing station is configured so that, in the impulse sealing cycle, the electric current source is operated to temporarily feed a high frequency electric current to the inductors, thereby generating a high frequency electromagnetic field with the inductors, wherein the high frequency electromagnetic field induces eddy currents in the respective susceptor element generating an impulse of heat that is emitted by the susceptor element, which impulses of heat seal the edge region of the walls to the attachment portion of the fitment and to each other.

Due to the extension of the at least one elongated inductor section at the rear side of the at least one susceptor element, preferably in close proximity to said rear side, and along the contoured front surface, the development of heat over the extension of the front of the jaw takes place in an attractive manner, in particular in a rather uniform manner. The elongation of the inductor section contributes to the homogeneity of the current density within the inductor section, e.g. compared to a coiled or another rather irregular shape of an inductor section. This homogeneity translates into homogeneity of the high frequency field, and thereby to homogeneity of the impulse heating of the susceptor element. The latter contributes to a reliable and effective heat sealing in the edge region between the walls of film material and between the walls of film material and the attachment portion of the fitment.

The homogeneity of the heat sealing and the impulse process allow to have a minimal clamping force of the jaws in the clamped position, e.g. far less than with the traditional continuous heated jaws. The clamping force may effectively only serve to assure an intimate surface contact between the walls and between the walls and the attachment portion. As discussed herein, preferred embodiment allow to enhance the intimacy of said contact, e.g. so as to exclude the presence of pockets of air between the surfaces to be joined by the heat sealing.

The fitment can for example be a spout for discharge of product from the pouch, e.g. a flowable product, e.g. a flowable food product, e.g. a beverage, sauce, etc. The fitment can have a neck that is closed or is configured to be closed by a closure member.

In an embodiment, the fitment is molded from a polymer, such as polyethylene (PE), for example high-density polyethylene (HDPE) or low-density polyethylene (LDPE), and/or polypropylene (PP), and/or polyethylene terephthalate (PET).

Preferably, the fitment is molded from a single type of a polymer, e.g. a mono-material, such as polyethylene (PE), for example high-density polyethylene (HDPE) and/or low-density polyethylene (LDPE), or polypropylene (PP), or polyethylene terephthalate (PET).

In a practically advantageous embodiment, the fitment is made of high-density polyethylene (HDPE) and the film material is made from one or more layers of polyethylene (PE), possibly multiple PE—layers with an intermediate layer of Ethylene vinyl alcohol (EVOH) as an oxygen barrier, e.g. for food packaging. A film material with a single type of polymer may still comprise a certain amount of EVOH, typically up to 5 wt %, whilst still being characterized as a mono-material. This embodiment is favoured in view of recyclability, for example.

The fitment can for example be a valve type fitment, a connector type fitment, etc. For example, the fitment comprises a slit valve, a bidon-type valve, etc., e.g. in combination with a cap, e.g. an overcap.

The provision of the induction impulse heatable member may provide that the start-up time, e.g. the time wherein the sealing station can become operable from an inactive state, is fairly limited. Compared to the known sealing stations with continuously heated jaws, it is not necessary to bring the jaws towards the sealing temperature, which required up to 30 minutes in the known sealing stations. Instead, in the inventive approach, the jaws of the sealing station may take less time to reach a steady state temperature, typically only in between 1 and 2 minutes, for example after the sealing station has been modified to make a different type of seal, e.g. for a different pouch packaging.

In an embodiment, the elongated inductor section is made from a metal, e.g. of copper.

In embodiments, the at least one elongated inductor section is a solid cross-section metal or other, preferably high conductivity material inductor section, e.g. made of copper which is preferred. This arrangement allows to avoid undue variations of current density within the inductor section, and thereby undesirable variation in the generated field, e.g. compared to an internally hollow inductor section. In alternative embodiment, the at least one elongated inductor section is a multi-strand Litz wire. It has been observed that in such embodiment, heating of the Litz-wire may become problematic and cooling is difficult.

In embodiments, the at least one elongated inductor section has a constant cross-section, preferably a solid cross-section, over its length along the contoured front surface of the respective jaw. This design avoids undue variations of current density within the inductor section, which might otherwise occur at locations where the cross-section changes, and thereby undesirable variation in the generated field.

In embodiments, the uniform cross-section elongated inductor section has, seen in a top view onto the jaw, a shape corresponding to the contoured front surface of the jaw and maintains a uniform distance between the susceptor element and the elongated inductor section. This arrangement enhances uniformity of the development of heat in the susceptor element.

In embodiments, the inductor of a jaw comprises multiple elongated inductor sections that are parallel to one another.

In embodiments, the inductor of a jaw comprises multiple elongated inductor sections that are parallel to one another and vertically spaced from one another by a horizontal slit, e.g. an air slit or a slit filled with electrically insulating material. In embodiments, there is just one pair of elongated inductor sections that are parallel to one another and vertically spaced from one another by a horizontal slit arranged in proximity of the rear side of the susceptor element.

In embodiments, said slit between neighbouring inductor sections that are arranged above one another has a height between 0.01 and 5 mm, more preferably between 0.1 and 2 mm.

In an embodiment, the inductor of a jaw comprises a pair of parallel inductor sections arranged at the rear side of the susceptor element, the one inductor section above the other inductor section, spaced from one another by an elongated slit, e.g. an air slit or a slit filled with electrically insulating material. In practical embodiments, there is just one pair of inductor section above one another in the jaw.

The presence of the slit between the parallel elongated inductor sections allows for a desirable concentration of the field that is generated by the inductor of the jaw. In an embodiment, the susceptor element extends, seen in a view onto the front surface of the jaw, over a horizontal slit between parallel inductor sections.

In an embodiment, the susceptor element, seen in a view onto the front of the jaw, extends over the slit between parallel elongated inductor sections and overlaps in said view with each of the parallel inductor sections. Preferably, in an embodiment, the susceptor element overlaps the entire height of the inductor sections. In another embodiment, the amount of overlap between the susceptor element and the parallel inductor sections is limited, for example the susceptor element overlaps with each inductor section over about 25% of the height of the inductor section. The height, and length, of the susceptor element is generally chosen in accordance with the seal to be made.

In an embodiment, the susceptor element is embodied as one strip that extends over the slit between parallel elongated inductor sections and overlaps in said view with each of the parallel inductor section.

With the strip-like susceptor element extending over the slit, the field generated by the inductor is advantageously concentrated in the susceptor element.

In an embodiment, a strip shaped susceptor element has an upper edge and a lower edge defining a height of the strip, wherein the height of the strip is at least 50% of the height of the single pair of inductor sections including the slit that are arranged at the rear of the strip above one another, e.g. between 75% and 125% of said height, e.g. about 100% of said height.

In an embodiment, a strip shaped susceptor element has an upper edge and a lower edge defining a height of the strip, wherein the inductor of a jaw comprises a number of, e.g. multiple, inductor sections that each extend along the rear side of the susceptor element. Herein the height of the strip is preferably at most the same as the height of the number of one or more inductor sections, preferably the upper edge and the lower edge of the strip not protruding above and below the height of the one or more inductor sections.

In an embodiment, the inductor of a jaw is embodied so that in a pair of adjacent and parallel inductor sections that are arranged at the rear side of the susceptor element, the current flows in the same direction through the inductor sections.

In an embodiment, the inductor of a jaw is embodied so that in a pair of adjacent and parallel inductor sections arranged at the rear side of the susceptor element, the current flows in opposite directions through the inductor sections.

In an embodiment, the inductor of a jaw comprises a C-shaped inductor element having parallel first and second inductor sections interconnected, e.g. by a bent portion, in series, wherein the free ends of the inductor sections have terminals for electrical connection to the current source.

In an embodiment, the inductor of a jaw comprises multiple nested C-shaped inductor elements, each having parallel first and second inductor sections interconnected in series, e.g. by a bent portion, wherein the free ends of these inductor sections have terminals for electrical connection to the current source. For example, the inductor has two nested C-shaped inductor elements.

In an embodiment, the first and/or second jaw is provided with one C-shaped inductor element, having parallel first and second inductor sections interconnected in series, wherein the free ends of the inductor sections have terminals for electrical connection to the current source.

In an embodiment, the inductor of a jaw comprises a C-shaped inductor element having parallel first and second inductor sections interconnected in series and arranged above one another, wherein the inductor sections are separated by a horizontal slit, e.g. an air slit or a slit filled with electrically insulating material.

In an embodiment, the inductor of a jaw comprises multiple, e.g. just two, elongated inductor sections arranged parallel to one another and arranged above one another behind the susceptor element.

In an embodiment, the susceptor element has a height and the inductor of a jaw comprises multiple inductor sections arranged parallel to one another and arranged above one another behind the susceptor element.

In an embodiment, the inductor of a jaw has an inductor element that is generally U-shaped seen from above, wherein each of the first and second elongated inductor sections thereof has a constant cross-section, preferably a solid cross-section, over its length and wherein each of said first and second inductor sections has a shape corresponding to the contoured front surface of the respective jaw when seen in said view from above.

In an embodiment, the at least one elongated inductor section has a thickness of between 1.0 and 4.0 mm, seen perpendicular to the front surface of the jaw, for example between 1.5 and 3.0 mm. The limited thickness of the inductor element enhances the cooling of the jaw, including the inductor of the jaw, e.g. as one or more cooling fluid ducts are preferably arranged in proximity of a rear side of the at least one inductor element.

In an embodiment the at least one elongated inductor section has a rectangular cross-section with a height that is greater than the thickness of the inductor section. This arrangement allows to limit the thickness, which allows for efficient cooling.

Each jaw may be provided with one or more cooling fluid ducts, e.g. the cooling fluid being a cooling liquid, e.g. water, being passed through the cooling fluid ducts, e.g. using a pump assembly, e.g. a cooling liquid circuit being a closed circuit including a heat exchanger configured to remove heat from the cooling liquid.

In an embodiment, or in combination with cooling by means of cooling liquid, air cooling can be employed for the jaws. Yet, due to the capacity, cooling by means of cooling liquid is preferred. Preferably the cooling liquid is passed in close proximity to the inductor of the jaw, e.g. directly behind the one or more elongated inductor sections. Preferably, no cooling fluid is passed in a region between the inductor and the susceptor as that would unduly increase the distance between them and would impair effectivity of the impulse heating induced by the field. It will be appreciated, that in view of the desired very close proximity of the susceptor element to the front surface of the jaw, there is in practice no space for any cooling duct in said region. So, in practical embodiments, cooling of the jaw is preferably done using a control flow of cooling fluid, e.g. liquid, through one or more ducts that are arranged behind, and preferably in close proximity to, the inductor sections.

In an embodiment, at least one cooling fluid duct extends along the at least one inductor section that extends along the rear side of the susceptor element.

It is preferred for the machine to be configured such that cooling of the jaw is active during the entire impulse sealing cycle, so also during the creation of the heat impulse which happens so fast that it is generally not impaired by the cooling. In another configuration, the cooling may be interrupted or reduced around the moment of the heat impulse.

The cooling of the jaws may, as preferred, be configured to cause cooling of the heat-sealed edge region before the jaws are opened, e.g. the film material and fitment being cooled to below 60° C. before opening, e.g. to below 40° C.

The cooling of the jaws may, as preferred, be configured to cause cooling of the heat-sealed edge region before the jaws are opened, e.g. the film material and fitment being cooled to below the crystallization temperature of the polymer material involved in the join.

A benefit of the cooling is that, before the release from the jaws, the sealed fitment securing region of the pouch will acquire a strength and rigidity that is greater than in absence of such cooling. This, for instance, may allow for an increased production speed of the machine wherein higher forces may be exerted on the walls of the pouch, e.g. in view of transport of the pouch or string of interconnected pouches through the machine. Undue stretching of the pouch, e.g. in the area of the fitment seal, is preventable to a large degree by use of the invention disclosed herein.

In an embodiment, the susceptor element is made of metal material, e.g. a metal or a metal alloy, e.g. of a thin metal strip.

For example, the susceptor element is made of, or comprises, aluminium, nickel, silver, stainless steel, molybdenum and/or nickel-chrome.

In an embodiment, the susceptor element is embodied as a strip having opposed front and rear main faces that define the thickness of the strip between them. In an embodiment, the thickness of the susceptor element strip is constant over the extension of the strip.

In an embodiment, the susceptor element is embodied as a planar strip, most preferably the jaw having a single planar strip susceptor element. This arrangement as a planar strip is in particular preferred for the handling of plastic fitments that have an attachment portion with planar and preferably smooth sealing faces. Herein, preferably, the plane of the susceptor element is parallel to the plane of the sealing face of the attachment portion of the fitment. The preferred smoothness of the sealing faces, so the absence of a relief that locally holds the wall of film material away from the sealing face and creates air pockets between the wall and the sealing face, causes a very effective transfer of the heat impulse from the jaw to the zone where the joint is made. In practice, it can be observed that a joint is achieved through the entirety of the area where the susceptor emits heat towards the sealing face of the attachment portion.

In an embodiment, the susceptor element comprises a paramagnetic material, a diamagnetic material, or a ferromagnetic material. Such magnetic materials may be effected by an electromagnetic field, in order to achieve eddy currents that cause the mentioned rapid heating in the impulse sealing technique.

In an embodiment, the susceptor element is a strip, e.g. of a metal, e.g. of aluminium, wherein the height of the strip is between 3 and 10 millimetres, e.g. between 4 and 8 millimeters. For example, as preferred, the strip has a constant height over its length.

Preferably, the susceptor element strip lacks apertures over its extension.

In an embodiment, the jaw is provided with a single continuous susceptor element embodied as a strip, e.g. of metal.

In an embodiment, the susceptor element, e.g. embodied as a strip, has a thickness of between 0.01 and 5 mm, preferably between 0.05 mm and 2 mm, more preferably between 0.08 mm and 0.8 mm, e.g. of between 0.08 mm and 0.5 mm. In general, it is considered desirable to have a minimum thickness of the susceptor element in view of the desire to rapidly cool the jaw, including the inductor and the susceptor, after termination of the heat impulse. A thin design of the susceptor contributes to this desire. It is noted that, in contrast to the impulse sealing device addressed in the introduction, no electric current from a current source is passed through the susceptor, so the cross-section need not be designed to deal with such a current flow.

In an embodiment, the jaw is provided with a single continuous susceptor element embodied as a strip, e.g. of metal, having a height of the strip between 3 and 10 millimetres, e.g. between 4 and 8 millimeters, and a thickness of between 0.08 and 0.8 mm, e.g. of between 0.08 and 0.5 mm. For example, the strip is made of aluminium material.

In embodiments, the frequency of the alternating electric current supplied to the inductor is between 100 kHz and 1 MHz, for example between 250 KHz and 750 KHz.

In embodiments, the magnitude of the electric current supplied to the inductor is between 20 A and 600 A.

In embodiment, the electric current is supplied to the inductor at a voltage with a magnitude between 40 V and 500 V.

In an embodiment, a jaw is embodied such that the high frequency electromagnetic field generated by the inductor primarily causes the very rapid development of heat within a frontal skin layer of the susceptor element due to the so-called skin effect. The skin effect is the tendency of an alternating electric current to become distributed within a conductor such that the current density is largest near the surface of the conductor and decreases, exponentially, with greater depths of the conductor. At high frequencies the skin depth becomes smaller.

This depth may, for example, be 0.15 mm for an aluminium susceptor element if the frequency of the field is 350

KHz. The thickness of the susceptor element is envisaged to be more than this skin depth, yet not too much for the reason addressed herein.

In case of a pouch with one or more side gussets, the edge region where the fitment is to be mounted may include a so-called triple point. In such a situation, it can be advantageous to provide a resilient backing layer behind the susceptor element, thereby allowing for the jaw front to accommodate for a local variation of the number of film material walls. As known in the art of pouch production the triple point is where there are two walls to be joined on one side of the point, and wherein there are two pairs of two wall segments (so four wall thicknesses in total) to be joined on the other side of the triple point. For example, in an embodiment, a silicone rubber layer or a Teflon layer is provided behind the susceptor element. For example, the resilient layer has a thickness between 0.3 and 2.0 millimeter, preferably between 0.4 and 0.7 mm. Herein it is understood that the thin susceptor element is able to flex so as to accommodate the local variation in the number of walls.

The provision of a resilient backing layer is preferably not done, so a resilient backing is preferably absent, unless truly required. This is in view of the thermal insulating effect provided by such an additional layer which may hamper the cooling action of the cooling device. Also the additional layer may increase the spacing between the inductor section and the susceptor element in an undesirable manner.

In an embodiment, the spacing between the rear of the susceptor element and the neighbouring inductor section(s) is at a minimum 0.025 mm, or 0.05 mm, or 0.1 mm and at a maximum 3.0 mm, or 2.0 mm, or 1.0 mm. The minimum values of this spacing are primarily envisaged to allow for effective electrical insulation between the inductor section(s) on the one hand and the susceptor element on the other hand. In embodiments, it is envisaged that this spacing is only filled with electrically insulating material. The maximum value of this spacing is primarily envisaged to have the inductor section(s) in close proximity to the rear of the susceptor element, wherein a maximum of 1.0 mm is preferred. In a practical embodiment this spacing may be 0.05 mm. Therefore, this spacing may in practical embodiments be less than the thickness of the susceptor element itself.

Preferably, the entire spacing between the rear of the susceptor element and the neighbouring inductor section(s) is filled with electrically insulating material.

In an embodiment, the spacing between the rear of the susceptor element and the neighbouring inductor section is filled with one or more layers of electrically insulating material, e.g. tape, for example at least a layer of Kapton tape and a layer of Teflon tape, for each just one layer of Kapton tape and one Layer of Teflon tape.

In an embodiment, the electrical insulation between the rear of the susceptor element and the neighbouring inductor section(s) has a thickness of between a minimum of 0.025 mm, or 0.050 mm, or 0.1 mm, and a maximum of at most 3.0 mm, or 2.0 mm.

In an embodiment, the anti-stick layer at the front of the jaw is embodied as a layer of Teflon tape. In another embodiment, the anti-stick layer could comprise glass or the like.

In an embodiment, the front face of the susceptor element is covered by a layer of electrically insulating material, e.g. tape, e.g. Kapton tape, e.g. having a thickness of between 0.01 mm and 0.05 mm, e.g. of about 0.025 mm.

In an embodiment, the spacing between the front surface of the jaw and the susceptor element is at a minimum 0.025 mm, or 0.050 mm, and at a maximum 2.0 mm, or 1.0 mm, or 0.5 mm. Herein, the minimum spacing may be governed by the presence of an anti-stick layer. The anti-stick layer can be coated onto the jaw, e.g. onto the susceptor element, e.g. a glass or Teflon coating.

In an embodiment, the spacing between the front surface of the jaw and the susceptor element is filled with multiple layers of electrically insulating tape, for example at least a layer of Kapton tape and a layer of Teflon tape as anti-stick layer forming the front surface of the jaw, for each just one layer of Kapton tape and one Layer of Teflon tape.

In an embodiment, the contoured front surface of the jaw is smooth in a region of contact with the walls of film material, at least in the recessed portion thereof, so lacking any relief that would locally keep the film material away from the front surface, so lacking for example one or more ribs, bosses, etc. This arrangement is preferred in conjunction with a smooth design of the sealing faces of the fitment attachment portion. Preferably, the smooth region of contact of the front surface of the jaw, at least in the recessed portion of the front surface, is designed to be parallel to the sealing surface of the attachment portion of the fitment that is to be joined to the walls of film material.

In an embodiment, the jaws are configured, e.g. have a length, so that the entire non-bonded edge region in which the fitment is inserted, e.g. by a fitment inserter of the machine, is sealed in one cycle by the operation of the jaws. So both the fitment is secured in the edge region and the entirety of the edge region is sealed closed. This avoids the needs for additional sealing actions along said edge region. In another embodiment, only the part where the fitment is located is sealed in the cycle, with another part remaining open. This, for example, allows for filling of the pouch via said open part. This open part is then later closed in another sealing step, e.g. also based on impulse sealing as disclosed herein.

In an embodiment, the recessed face portion of each jaw is composed of a curved central face portion adjoined at both sides thereof by a rectilinear face portion. In another embodiment, the recessed face portion is curvaceous over its entire extension.

The embodiment wherein the recessed face portion of each jaw is composed of a curved central face portion adjoined at both sides thereof by a rectilinear face portion, is preferred in conjunction with a fitment having an attachment portion of similar design, so with a sealing face of the attachment portion being composed of a curved (outwardly convex) central sealing face portion adjoined at both sides thereof by a rectilinear sealing face portion. Such a design of the attachment portion is, for example, shown in FIGS. 3 and 4 of WO03/031280. The presence of straight portions is advantageous in view of the homogeneity of the heat impulse that can be created to effect the join in those regions, e.g. compared to non-straight portions.

The impulse sealing technique for the fitment as discussed herein is advantageously applicable for a fitment with an attachment portion that has thin sealing walls, e.g. the sealing walls depending from a transverse wall of the fitment body. The sealing walls may have a thickness of less than 2 mm, in practical embodiments.

Preferably, the sealing walls are smooth on their sealing faces, so lacking any relief that keeps the film material locally away from the sealing wall in the desired region of the join.

In embodiments, one or both jaws have a main body, e.g. of plastic or ceramic material, e.g. a heat-resistant material, e.g. of PEEK, on which the susceptor element and/or the inductor are mounted. The plastic or ceramic material is selected to not impair the field that is generated by the inductor, at least not in an undesirable manner. Boron nitride and/or Aluminium nitride, Polyphenylene sulphide, vulcanized silicone materials can be considered as well for the main body. In particular, Boron nitride provides for a good thermal conductivity, thereby enabling a good conductivity of heat from the susceptor element and inductor towards the cooling device, e.g. towards the cooling fluid circulated through the jaw.

The main body can be 3D-printed if desired.

For example, the one or more cooling ducts are provided, e.g. machined, in the main body.

For example, one or more cooling ducts extend generally in parallel to the one or more inductor sections, e.g. one duct behind each inductor section.

For example, one or both jaws have a main body, e.g. of plastic or ceramic material, having a main body front side into which one or more grooves are made in which the one or more inductor sections are arranged. In embodiments, the susceptor element is arranged over the main body front side, as discussed herein relative to the one or more inductor sections. Herein, one or more layers of electrically insulation material are arranged between the inductor section(s) and the susceptor element, e.g. of Kapton and/or Teflon. One or more further layers of electrically insulating material as well as an outer anti-stick covering are mounted over the susceptor element to from the front surface of the jaw.

In embodiment, the sealing device is configured to provide a heat impulse with the susceptor element of between at least 150° C. and at most any of 200° C., 300° C., 400° C., or 500° C. measured on the susceptor element. It is noted that due to the, often, very short duration of the heat impulse and the highly dynamic changes of the temperature, directly measuring this temperature requires complex/expensive temperature measurement equipment. On the basis of the inputted electrical energy and analysis of heat flow/loss, the temperature that is achieved can be approximated.

In an embodiment, the heat impulse duration lies between 10 and 1000 milliseconds, e.g. between 20 and 500 milliseconds, e.g. between 75 and 400 milliseconds.

In an embodiment, the cycle includes a clamped cooling phase directly following the heat impulse during which the jaws are maintained in clamped position, which clamped cooling phase may have a duration between 200 and 800 milliseconds, e.g. between 300 and 600 milliseconds. In practical embodiments, the clamped cooling phase may be longer than the heat impulse as cooling is slowed down by the thermal insulating properties of plastic materials.

It is noted that control of the temperature that is reached during the impulse heating may be done on the basis of monitoring and controlling, the supply of electrical power to the inductor and/or by monitoring and controlling the temperature and/or flow rate of cooling fluid, e.g. water, circulated along the respective jaws.

In an embodiment, the sealing device, e.g. a control unit thereof, is configured to effect a preheating of the susceptor element before the actual impulse heat sealing is carried out. For example, the susceptor element is preheated to a preheating temperature of between 50 and 120 degrees Celsius, e.g. between 60 and 80 degrees Celsius, before the heat impulse is carried out at a higher temperature of the susceptor element. The preheating may take place at a preheating temperature that is preferably low enough to prevent the film material to be significantly influenced. At the same time, the preheating reduces the difference in temperature between that of the susceptor, prior to the heat impulse, and the desired temperature of the susceptor during the heat impulse. The reduced temperature difference provides that the peak temperature during the heat impulse may be reached in less time and that the high frequency electromagnetic field only needs to be provided for a shorter period of time. As such, the required time for the heat sealing may be reduced, resulting in an increased production rate. Furthermore, the shorter heat impulse time may serve to avoid a risk of damaging the film material. In a further embodiment, the sealing device, e.g. a control unit thereof, is configured to control preheating of the susceptor element before the jaws are brought in the clamped position.

In an embodiment, the fitment, e.g. the attachment portion thereof, is pre-heated prior to the impulse sealing. For example, the attachment portion is exposed to an infrared heater. It is, however, preferred to avoid a preheating of the fitment to be sealed as this may impair the stability of the fitment and/or require extended cooling after the heat impulse, thereby slowing down the process.

In an embodiment, the production machine comprises at least one temperature sensor configured to sense the actual temperature of a jaw, e.g. of a front surface of the jaw, e.g. of or near the susceptor element of the jaw, e.g. of the main body, which temperature sensor is linked to a control unit of the current source. Herein the control unit, e.g. computerized, is configured to adjust the current that is fed to the inductor on the basis of the output of the temperature sensor. For example, the current source is adjusted with respect to a preheating of the jaws and/or the impulse heating. Alternatively or additionally, the control unit, e.g. computerized, is configured to adjust the temperature and/or flow rate of cooling fluid circulated along the respective jaws on the basis of the output of the temperature sensor. For example, the cooling device is adjusted with respect to a preheating of the jaws and/or the impulse heating.

The controlling may take place via a feedback-type control mechanism, such that measured values during a first sealing cycle forms the basis for controlling the current source and/or cooling device, in order to influence the impulse heating and/or cooling for subsequent sealing cycles.

In an embodiment, the control unit may be configured to log during production of pouches one or more sealing parameters in relation to the produced pouches, such as one or more actual settings of the current source and/or the cooling device, in order to be able to retrieve afterwards which seal, e.g. which pouch has been made at which specific setting(s). This may contribute to the monitoring of the quality of the seals in the pouches that are being made.

In an embodiment, the temperature sensor is configured and used to measure the temperature of at least one of the jaws in a phase of the cycle that is distinct from the heat impulse phase itself. For example, the temperature is measured when the jaws are in their opened position. For example, the temperature sensor is a contactless temperature sensor, e.g. aimed at the front surface of a jaw.

In an embodiment, a temperature measurement performed during one or more cycles, is used to adjust the current source for performance of one or more subsequent impulse sealing cycles.

The production machine is primarily envisaged for production of pouches from metal-free film material. For example, the film material of the walls is a multi-layer material where one and the same plastic, but with different properties, is found in all layers. In another embodiment the wall is a monolayer wall. The absence of a metal layer allows for more effective recycling.

In an embodiment, the film material, preferably metal-free film material, comprises one or more layers each comprising or consisting of polyethylene (PE), for example high-density polyethylene (HDPE) or low-density polyethylene (LDPE), and/or polypropylene (PP), and/or polyethylene terephthalate (PET). The film material may thereby comprise a mixture of two or more of these polymers, a laminate with one or more layers each consisting of one or more polymers, or a single layer with a single one of these polymers. These polymers may have different properties, for example in terms of mechanical strength and/or sealing capabilities, which may all be used to obtain a suitable material for the pouches.

In an embodiment, the film material is made entirely from polyethylene (PE), for example high-density polyethylene (HDPE) or low-density polyethylene (LDPE), polypropylene (PP), or polyethylene terephthalate (PET). According to this embodiment, the film material consists of a single type of polymer, e.g. a mono-material which may optionally allow the film material to consist of a single polymeric layer. The use of only a single polymer may improve the recyclability of the pouch, since it may no longer be required to separate the various polymers, since the pouch wall only comprises a single polymer. Also any metal layer is absent.

In an embodiment, the film material includes a layer of Ethylene vinyl alcohol (EVOH) as an oxygen barrier, e.g. for food packaging, e.g. as a substitute for a metal layer in the film which is preferably absent. A film material with a single type of polymer as defined above may still comprise a certain amount of EVOH, typically up to 5 wt %, whilst still being characterized as a mono-material.

In an embodiment, the film material is printed, e.g. a surface print being provided on the side that is contacted by a jaw of the sealing station having a susceptor and inductor. The impulse sealing does not impair the quality of the surface print in contrast to the use of continuously heated seal jaws. In an embodiment, the film material is subjected to inline surface printing of the film material, e.g. just prior to the sealing as disclosed herein.

In an embodiment, the fitment is molded from the same polymer as the walls of the pouch, or a rather similar polymer to enhance recycling.

In an embodiment, the fitment is molded from a polymer, such as polyethylene (PE), for example high-density polyethylene (HDPE) or low-density polyethylene (LDPE), and/or polypropylene (PP), and/or polyethylene terephthalate (PET). The fitment material may thereby be molded from a single one of these polymers or a mixture/blend of two or more of these polymers. These polymers may have different properties, for example in terms of mechanical strength and/or sealing capabilities, which may all be used to obtain a suitable material for the fitments.

In an embodiment, the fitment is molded from a single type of a polymer, e.g. a mono-material, such as polyethylene (PE), for example high-density polyethylene (HDPE) or low-density polyethylene (LDPE), or polypropylene (PP), or polyethylene terephthalate (PET). The use of only a single polymer may improve the recyclability of the pouch, since it may no longer be required to separate the various polymers, since the fitment only comprises a single polymer.

In a further embodiment, the fitment is molded from a polyethylene (PE), such as high-density polyethylene (HDPE) or low-density polyethylene (LDPE). Typically, the high-density polyethylene (HDPE) may be stronger and/or more stable than the low-density polyethylene (LDPE), but may also be more rigid. In prior art sealing stations with continuously-heated jaws, it was considered impractical for pouchmaking to heat seal a fitment made of high-density polyethylene (HDPE) to a pouch wall made of polyethylene (PE) only, e.g. in absence of a metal layer in the film, since the rigid HDPE fitment appeared to damage the pouch wall during sealing, as a result of the relatively high temperatures and the large clamping forces required in the prior art approach. With the present induction based impulse sealing, the temperature peak of the heat impulse is only present for a very short time and the clamping force may be very low, thereby enabling the sealing of fitments made of high-density polyethylene (HDPE), without damaging mono-material pouch walls.

In a further embodiment, the fitment is molded from a polyethylene (PE), preferably from high-density polyethylene (HDPE) or low-density polyethylene (LDPE), and the film material is made entirely from polyethylene (PE), preferably from low-density polyethylene (LDPE). The use of only a single polymer, e.g. polyethylene (PE), and the lack of a metal layer, may improve the recyclability of the pouch, since it may no longer be required to separate the various polymers or to separate the fitment from the pouch walls, since the fitment and the pouch both consist of the same polymer, e.g. polyethylene (PE).

In an alternative embodiment, the fitment is molded from polypropylene (PP) and the film material is made entirely from polypropylene (PP). The use of only a single polymer, e.g.

polypropylene (PP), and the lack of a metal layer, may improve the recyclability of the pouch, since it may no longer be required to separate the various polymers or to separate the fitment from the pouch walls, since the fitment and the pouch both consist of the same polymer, e.g. polypropylene (PP).

In an embodiment, the production machine is embodied with a conveyance mechanism that is configured to convey individual pouches or a string of interconnected pouches along a path of conveyance, wherein the sealing station as discussed herein is arranged along said path of conveyance. In an embodiment, the conveyance mechanism is configured and operated to convey in an intermittent motion pattern, so stepwise. Often a so-called walking beam conveyance mechanism is employed for stepwise conveyance. The sealing action is then performed with the pouch at rest, in practical embodiments with the sealing station mounted stationary in the machine, at least with regards to the direction of conveyance.

In an embodiment, the conveyance mechanism is configured and operated to convey individual pouches or a string of interconnected pouches along a path of conveyance in a continuous motion, so without stopping and starting. Herein it is envisaged that the sealing station comprises a motion device that allows to move a pair of jaws in synchronicity with the continuously moving pouch or string of pouches during the impulse sealing cycle. An advantage of this approach that undesirable deformations of the pouch are avoided, which would otherwise result from rapid stopping and starting. For example, the sealing station comprises an endless motion device wherein one or more, preferably multiple, sealing devices are moved along an endless path that extends over a segment thereof along the path of conveyance.

In the continuous motion device, it is preferred for the cooling device to be embodied such that continuous circulation of coolant through the one or more cooling ducts in the jaws can be established. This may entail the use of one or more rotary couplings to connected, for example, one or more hoses connected to the jaws via the one or more rotary couplings to a stationary mounted pumping and heat exchanger system.

In an embodiment, the machine comprises one or more of:
- a roll handling station adapted to receive one or more rolls of heat-sealable film material,
- one or more pouch forming stations adapted and operated to form the film material dispensed by the roll handling station into a succession of pouches, e.g. distinct pouches or a string of still interconnected pouches, each pouch having at least one non-bonded edge region between two opposed walls of the pouch, for example a pouch forming station being embodied as a folding station, e.g. to fold film material dispensed from a single roll into a shape with a bottom gusset, for example a pouch forming station being embodied as a cutting station, e.g. to make one or more cuts to shape and/or separate, e.g. in part, the pouches,
- a fitment inserting device adapted to insert the attachment portion of the fitment in the non-bonded edge region,
- the fitment sealing station as discussed herein,
- a feed mechanism adapted and operated to feed said formed pouches, e.g. separate or as a string of still interconnected pouches, to the fitment inserting device and the fitment sealing device, which devices may be located at one at the same station,
- a fitment feeder adapted and operated to feed plastic fitments to the fitment inserting device.

In embodiments, the machine is configured for production of pouches having one or more gussets, e.g. in a side and/or in a bottom of the pouch, e.g. with the fitment being heat sealed between the walls at the top of the pouch.

In embodiments, the machine comprises a filling station, configured to fill a product into the pouch.

In an embodiment, the filling station is configured to fill the product into the pouch prior to the sealing of the fitment to the pouch as discussed herein. The filling can then, for example, be performed via the non-bonded edge region into which the fitment is sealed at a later stage in the manner as discussed herein.

In an embodiment, the filling of the pouch on the production machine is done after performing the impulse sealing cycle at the mentioned station. For example, the filling is done via the fitment, e.g. in an aseptic filling device, optionally followed by a closing step wherein the fitment is closed, e.g. in a capping station provided with a capping device configured and operated to place a cap on the fitment.

In an embodiment, the pre-made spout supplied to the spout inserter device is part of a pre-made fitment-closure assembly comprising the spout and a closure member closing said spout, so that after performing the impulse sealing step that secures the spout and closes the edge region and any additional sealing of all non-bonded regions a hermetically closed pouch is obtained. In an embodiment, this pouch is then empty. For example, the hermetically closed, still empty pouch, is then transferred to a remote filling device, where a product is filled into the pouch via the spout, e.g. in an aseptic filling device, wherein the filling device removes or opens the closure member, fills the product into the pouch, followed by a closing step wherein the spout is closed, e.g. by moving the closure member into a closed position thereof, e.g. replacing the closure member back onto the spout, or by replacing the removed closure member by another closure member, e.g. in a capping station provided with a capping device configured and operated to place a cap on the spout.

In an embodiment, the machine comprises a film material sterilization station that is configured to subject the film material dispensed from the one or more rolls to a sterilization process. In an embodiment, the machine is provided with a sterile or aseptic chamber that extends from said film material sterilization station onwards until and including the fitment sealing station, preferably also past any further sealing station, so that the formation of a hermetically closed pouch is performed in said sterile or aseptic chamber.

In an embodiment, a filling station is arranged in or along said sterile or aseptic chamber, so that both the production of the pouch and the filling of the pouch, and preferably also the hermetic sealing of the pouch (e.g. by provision of the spout, possible already closed or possibly closed by a later capping action) is done within the one sterile or aseptic chamber.

In an embodiment, the production machine comprises one or more additional sealing devices in order to seal the walls of film material in other regions in order to produce the pouches.

This is commonly known in the art. For example, a side sealing device is provided that is configured to establish a side or vertical seal of the pouch, e.g. side seals along opposite vertical side of the pouch in a horizontal form-fill-seal machine. For example, a bottom sealing device is provided that is configured to establish a bottom seal of the pouch, e.g.

In an embodiment, all sealing devices of the production machine, including the fitment sealing device as discussed herein, are located at one and the same station of the production machine. For example, the sealing devices acting in succession to provide the various seals without the film material being moved relative to the sealing devices during the entirety of the various sealing steps. In an embodiment, all said sealing devices are arranged in one sterile or aseptic chamber of the production machine.

The first aspect of the invention also relates to a method for the production of collapsible pouches having a fitment, e.g. a spout, wherein use is made of a production machine as described herein.

The first aspect of the invention also relates to a fitment sealing station for use in the production of collapsible pouches as described herein.

The first aspect of the invention also relates to an impulse sealing device for use in the production of collapsible pouches as described herein.

A second aspect of the invention relates to a production machine for the production of collapsible pouches having a fitment, said pouches each having walls made from heat-sealable film material, preferably metal-free heat-sealable film material, wherein the production machine comprises a fitment sealing station that is configured to heat seal a plastic fitment having an attachment portion in a non-bonded edge region between opposed first and second walls made from heat-sealable film material, wherein the non-bonded edge region has a length and a height, wherein the fitment sealing station comprises:
- an impulse sealing device comprising a first jaw and a second jaw,
- an actuator device configured to move the first and second jaws relative to one another between an opened position and a clamped position,
- a cooling device configured to cool each of the first and second jaws, wherein the first jaw has a first contoured front surface configured to contact the edge region of a respective first wall of the pouch, wherein the second jaw has a second contoured front surface configured to contact the edge region of a respective second wall of the pouch, wherein the first and second contoured front surfaces each have a recessed face portion defining a recess configured to receive therein a half of the attachment portion of the fitment, and wherein the first and second contoured front surfaces each define, on opposite sides of the respective recessed face and adjoining said recessed face, coplanar face portions, wherein each of the first and second jaws comprises at the respective contoured front surface thereof at least one, e.g. a single elongated, impulse heatable member that extends along the recessed face portion and the coplanar face portions of the respective front surface and that is covered by a heat-resistant non-stick covering, wherein the production machine is configured such that, in operation, the fitment is positioned with the attachment portion thereof in the non-bonded edge region, between the opposed first and second walls made from heat-sealable film material, and wherein the fitment sealing station is configured to perform an impulse sealing cycle, wherein the actuator device is configured to bring the first and second jaws into the clamped position, so that—in the edge region—the first and second walls are clamped against the attachment portion of the fitment by the recessed faces of the first and second jaws and so that—in the edge region—the first and second walls on opposite sides of the fitment are clamped against one another by the coplanar faces of the first and second jaws, and wherein the fitment sealing station is configured to, in the clamped position, temporarily energize the impulse heatable members so as to generate an impulse of heat that is emitted by each of the impulse heatable members, which impulses of heat seal the edge region of the first and second walls to the attachment portion of the fitment and to each other on opposite sides of the attachment portion, wherein the first and second jaws, at least the impulse heatable members thereof, cool down after termination of the energizing assisted therein by operation of the cooling device, and wherein the actuator device is configured to move the first and second jaws into the opened position after the impulse heatable members have cooled down, wherein the production machine comprises a conveyance mechanism that is configured to convey individual pouches or a string of interconnected pouches along a path of conveyance in a continuous motion, said path at least extending along the fitment sealing station, and wherein the sealing station comprises a motion device that allows to move the first and second jaws in synchronicity with the continuously moving pouch or string of pouches during the impulse sealing cycle.

The second aspect of the invention allows to achieve a high production rate, as the impulse sealing cycle can be short and as there is no start and stopping of the pouches, or string of interconnected pouches, for the sealing.

In the second aspect of the invention the impulse heatable member can be embodied as a resistor band through which an electric current is passed to create the impulse of heat, e.g. as described in DE19737471.

In the second aspect the invention the impulse heatable member can be embodied as a susceptor element comprising electrically conductive material, said susceptor element having a rear side facing away from the respective contoured front surface, wherein each of the first and second jaws comprises an inductor which is electrically insulated from the respective susceptor element, and wherein the fitment sealing station comprises a high frequency electric current source, which is connected to the inductor of each of the first and second jaws, wherein the fitment sealing station is configured so that, in the impulse sealing cycle, the electric current source is operated to temporarily feed a high frequency electric current to the inductors, thereby generating a high frequency electromagnetic field with the inductors, wherein the high frequency electromagnetic field induces eddy currents in the respective susceptor element generating an impulse of heat that is emitted by the susceptor element, which impulses of heat seal the edge region of the walls to the attachment portion of the fitment and to each other.

In an embodiment of the second aspect of the invention, the inductor comprises an elongated inductor section that extends along the respective contoured front surface at the rear side of the respective at least one susceptor element.

The fitment sealing station may be embodied with details as described herein with reference to the first aspect of the invention, including one or more of the optional and/or preferred details thereof, e.g. as stated in the appended claim set.

The second aspect of the invention also relates to a method for production of collapsible pouches using the production machine.

A third aspect of the present invention relates to a production machine for the production of collapsible pouches having a fitment, said pouches each having walls made from heat-sealable film material, preferably metal-free heat-sealable film material, wherein the production machine comprises a fitment sealing station that is configured to heat seal a plastic fitment having an attachment portion in a non-bonded edge region between opposed first and second walls made from heat-sealable film material, wherein the non-bonded edge region has a length and a height, wherein the fitment sealing station comprises:
   an impulse sealing device comprising a first jaw and a second jaw,
   an actuator device configured to move the first and second jaws relative to one another between an opened position and a clamped position,
   a cooling device configured to cool each of the first and second jaws, wherein the first jaw has a first contoured front surface configured to contact the edge region of a respective first wall of the pouch, wherein the second jaw has a second contoured front surface configured to contact the edge region of a respective second wall of the pouch, wherein the first and second contoured front surfaces each have a recessed face portion defining a recess configured to receive therein a half of the attachment portion of the fitment, and wherein the first and second contoured front surfaces each define, on opposite sides of the respective recessed face and adjoining said recessed face, coplanar face portions, wherein each of the first and second jaws comprises at the respective contoured front surface thereof at least one, e.g. a single elongated, impulse heatable member that extends along the recessed face portion and the coplanar face portions of the respective front surface and that is covered by a heat-resistant non-stick covering, wherein the production machine is configured such that, in operation, the fitment is positioned with the attachment portion thereof in the non-bonded edge region, between the opposed first and second walls made from heat-sealable film material, and wherein the fitment sealing station is configured to perform an impulse sealing cycle, wherein the actuator device is configured to bring the first and second jaws into the clamped position, so that—in the edge region—the first and second walls are clamped against the attachment portion of the fitment by the recessed faces of the first and second jaws and so that—in the edge region—the first and second walls on opposite sides of the fitment are clamped against one another by the coplanar faces of the first and second jaws, and wherein the fitment sealing station is configured to, in the clamped position, temporarily energize the impulse heatable members so as to generate an impulse of heat that is emitted by each of the impulse heatable members, which impulses of heat seal the edge region of the first and second walls to the attachment portion of the fitment and to each other on opposite sides of the attachment portion, wherein the first and second jaws, at least the impulse heatable members thereof, cool down after termination of the energizing assisted therein by operation of the cooling device, and wherein the actuator device is configured to move the first and second jaws into the opened position after the impulse heatable members have cooled down, wherein each impulse heatable member is a susceptor element comprising electrically conductive material, said susceptor element having a rear side facing away from the respective contoured front surface, and wherein each of the first and second jaws comprises an inductor which is electrically insulated from the respective susceptor element, and wherein the fitment sealing station comprises a high frequency electric current source, which is connected to the inductor of each of the first and second jaws, wherein the fitment sealing station is configured so that, in the impulse sealing cycle, the electric current source is operated to temporarily feed a high frequency electric current to the inductors, thereby generating a high frequency electromagnetic field with the inductors, wherein the high frequency electromagnetic field induces eddy currents in the respective susceptor element generating an impulse of heat that is emitted by the susceptor element, which impulses of heat seal the edge region of the walls to the attachment portion of the fitment and to each other, and wherein the inductor and susceptor element in a jaw are configured such that the high frequency electromagnetic field generated by the inductor primarily causes a rapid development of heat within a frontal skin layer of the susceptor element due to the skin effect.

The fitment sealing station may be embodied with details as described herein with reference to the first aspect of the invention, including one or more of the optional and/or preferred details thereof, e.g. as stated in the appended claimset.

The third aspect of the invention also relates to a method for production of collapsible pouches using the production machine.

A fourth aspect of the invention relates to a method for production of collapsible pouches using a production machine for the production of collapsible pouches having a fitment, said pouches each having walls made from heat-sealable film material, preferably metal-free heat-sealable film material, wherein the production machine comprises a fitment sealing station that is configured to heat seal a plastic fitment having an attachment portion in a non-bonded edge region between opposed first and second walls made from heat-sealable film material, wherein the non-bonded edge region has a length and a height, wherein the fitment sealing station comprises:
an impulse sealing device comprising a first jaw and a second jaw,
an actuator device configured to move the first and second jaws relative to one another between an opened position and a clamped position,
a cooling device configured to cool each of the first and second jaws, wherein the first jaw has a first contoured front surface configured to contact the edge region of a respective first wall of the pouch, wherein the second jaw has a second contoured front surface configured to contact the edge region of a respective second wall of the pouch, wherein the first and second contoured front surfaces each have a recessed face portion defining a recess configured to receive therein a half of the attachment portion of the fitment, and wherein the first and second contoured front surfaces each define, on opposite sides of the respective recessed face and adjoining said recessed face, coplanar face portions, wherein each of the first and second jaws comprises at the respective contoured front surface thereof at least one, e.g. a single elongated, impulse heatable member that extends along the recessed face portion and the coplanar face portions of the respective front surface and that is covered by a heat-resistant non-stick covering, wherein the production machine is configured such that, in operation, the fitment is positioned with the attachment portion thereof in the non-bonded edge region, between the opposed first and second walls made from heat-sealable film material, and wherein the fitment sealing station is configured to perform an impulse sealing cycle, wherein the actuator device is configured to bring the first and second jaws into the clamped position, so that—in the edge region—the first and second walls are clamped against the attachment portion of the fitment by the recessed faces of the first and second jaws and so that—in the edge region—the first and second walls on opposite sides of the fitment are clamped against one another by the coplanar faces of the first and second jaws, and wherein the fitment sealing station is configured to, in the clamped position, temporarily energize the impulse heatable members so as to generate an impulse of heat that is emitted by each of the impulse heatable members, which impulses of heat seal the edge region of the first and second walls to the attachment portion of the fitment and to each other on opposite sides of the attachment portion, wherein the first and second jaws, at least the impulse heatable members thereof, cool down after termination of the energizing assisted therein by operation of the cooling device, and wherein the actuator device is configured to move the first and second jaws into the opened position after the impulse heatable members have cooled down, wherein the contoured front surface of the jaw is smooth in a region of contact with the walls of film material, at least in the recessed portion thereof, devoid of any relief that would locally keep the film material away from the front surface, wherein the sealing faces of the attachment portion of the fitment are smooth, devoid of any relief that would locally keep the film material away from the sealing surface.

All methods described in the present application are primarily envisaged for the production of pouches from metal-free film material. For example, the film material of walls of the pouch is a multi-layer material where one and the same plastic, but with different properties, is found in all layers. In another embodiment the wall is a monolayer wall. The absence of a metal layer allows for more effective recycling. It is noted that the presence of a metal layer in the film material, is also envisaged in the context of the present applications. The impulse sealing is equally possible in the presence of such metal layer.

In embodiments of the methods, the film material, preferably metal-free film material, comprises one or more layers each comprising or consisting of polyethylene (PE), for example high-density polyethylene (HDPE) or low-density polyethylene (LDPE), and/or polypropylene (PP), and/or polyethylene terephthalate (PET). The film material may thereby comprise a mixture of two or more of these polymers, a laminate with one or more layers each consisting of one or more polymers, or a single layer with a single one of these polymers. These polymers may have different properties, for example in terms of mechanical strength and/or sealing capabilities, which may all be used to obtain a suitable material for the pouches.

In embodiments of the methods, the film material is made entirely from polyethylene (PE), for example high-density polyethylene (HDPE) or low-density polyethylene (LDPE), polypropylene (PP), or polyethylene terephthalate (PET). According to this embodiment, the film material consists of a single type of polymer, e.g. a mono-material which may optionally allow the film material to consist of a single polymeric layer. The use of only a single polymer may improve the recyclability of the pouch, since it may no longer be required to separate the various polymers, since the pouch wall only comprises a single polymer. Also, any metal layer is absent.

In embodiments of the methods, the film material includes a layer of Ethylene vinyl alcohol (EVOH) as an oxygen barrier, e.g. for food packaging, e.g. as a substitute for a metal layer in the film which is preferably absent. A film material with a single type of polymer as defined above may still comprise a certain amount of EVOH, typically up to 5 wt %, whilst still being characterized as a mono-material.

In an embodiment, the film material is printed, e.g. a surface print being provided on the side that is contacted by a jaw of the sealing station having a susceptor and inductor. The impulse sealing does not impair the quality of the surface print in contrast to the use of continuously heated seal jaws. In an embodiment, the film material is subjected to inline surface printing of the film material, e.g. just prior to the sealing as disclosed herein.

In embodiments of the methods, the fitment is molded from the same polymer as the walls of the pouch, or a rather similar polymer to enhance recycling.

In embodiments of the methods, the fitment is molded from a polymer, such as polyethylene (PE), for example high-density polyethylene (HDPE) or low-density polyethylene (LDPE), and/or polypropylene (PP), and/or polyethylene terephthalate (PET). The fitment material may thereby be molded from a single one of these polymers or a mixture/blend of two or more of these polymers. These polymers may have different properties, for example in terms of mechanical strength and/or sealing capabilities, which may all be used to obtain a suitable material for the fitments.

In embodiments of the methods, the fitment is molded from a single type of a polymer, e.g. a mono-material, such as polyethylene (PE), for example high-density polyethylene (HDPE) or low-density polyethylene (LDPE), or polypropylene (PP), or polyethylene terephthalate (PET). The use of only a single polymer may improve the recyclability of the pouch, since it may no longer be required to separate the various polymers, since the fitment only comprises a single polymer.

In further embodiments of the methods, the fitment is molded from a polyethylene (PE), such as high-density polyethylene (HDPE) or low-density polyethylene (LDPE). Typically, the high-density polyethylene (HDPE) may be stronger and/or more stable than the low-density polyethylene (LDPE), but may also be more rigid. In prior art production methods that rely on sealing stations with continuously-heated jaws, it was considered impractical for pouchmaking to heat seal a fitment made of high-density polyethylene (HDPE) to a pouch wall made of polyethylene (PE) only, e.g. in absence of a metal layer in the film, since the rigid HDPE fitment appeared to damage the pouch wall during sealing, as a result of the relatively high temperatures and the large clamping forces required in the prior art approach. With the present induction based impulse sealing, the temperature peak of the heat impulse is only present for a very short time and the clamping force may be very low, thereby enabling the sealing of fitments made of high-density polyethylene (HDPE), without damaging mono-material pouch walls.

In further embodiments of the methods, the fitment is molded from a polyethylene (PE), preferably from high-density polyethylene (HDPE) low-density polyethylene (LDPE), and the film material is made entirely from polyethylene (PE), preferably from low-density polyethylene (LDPE). The use of only a single polymer, e.g. polyethylene (PE), and the lack of a metal layer, may improve the recyclability of the pouch, since it may no longer be required to separate the various polymers or to separate the fitment from the pouch walls, since the fitment and the pouch both consist of the same polymer, e.g. polyethylene (PE).

In alternative embodiments of the methods, the fitment is molded from polypropylene (PP) and the film material is made entirely from polypropylene (PP). The use of only a single polymer, e.g. polypropylene (PP), and the lack of a metal layer, may improve the recyclability of the pouch, since it may no longer be required to separate the various polymers or to separate the fitment from the pouch walls, since the fitment and the pouch both consist of the same polymer, e.g. polypropylene (PP).

In an embodiment, the recessed face portion of each jaw is composed of a curved central face portion adjoined at both sides thereof by a rectilinear face portion, wherein the sealing faces of the attachment portion of the fitment are composed of a curved, outwardly convex, central sealing face portion adjoined at both sides thereof by a rectilinear sealing face portion. Such a design of the attachment portion is, for example, shown in FIGS. 3 and 4 of WO03/031280. The presence of straight portions is advantageous in view of the homogeneity of the heat impulse that can be created to effect the join in those regions, e.g. compared to non-straight portions.

In an embodiment, each of the first and second jaws has at the respective contoured front surface thereof a single elongated, impulse heatable member that extends along the recessed face portion and the coplanar face portions of the respective front surface and that is covered by a heat-resistant non-stick covering.

In the fourth aspect of the invention the impulse heatable member can be embodied as a resistor band through which an electric current is passed to create the impulse of heat, e.g. as described in DE19737471.

In the fourth aspect the invention the impulse heatable member can be embodied as a susceptor element comprising electrically conductive material, said susceptor element having a rear side facing away from the respective contoured front surface, wherein each of the first and second jaws comprises an inductor which is electrically insulated from the respective susceptor element, and wherein the fitment sealing station comprises a high frequency electric current source, which is connected to the inductor of each of the first and second jaws, wherein the fitment sealing station is configured so that, in the impulse sealing cycle, the electric current source is operated to temporarily feed a high frequency electric current to the inductors, thereby generating a high frequency electromagnetic field with the inductors, wherein the high frequency electromagnetic field induces eddy currents in the respective susceptor element generating an impulse of heat that is emitted by the susceptor element, which impulses of heat seal the edge region of the walls to the attachment portion of the fitment and to each other.

In an embodiment of the fourth aspect of the invention the inductor comprises an elongated inductor section that extends along the respective contoured front surface at the rear side of the respective at least one susceptor element.

The fitment sealing station in the fourth aspect of the invention may be embodied with details as described herein with reference to the first aspect of the invention, including one or more of the optional and/or preferred details thereof, e.g. as stated in the appended claimset.

The fourth aspect of the invention also relates to a production machine configured for use in the method.

Embodiments of the pouch production according to the invention will be described by way of example only, with reference to the accompanying drawings. In the drawings:

FIG. 1 schematically shows a view in perspective of an embodiment of the pouch production according the invention, FIG. 2 schematically shows an example of a spout to be joined between two opposed film material walls of a pouch, FIG. 3 schematically shows a top portion of a pouch provided with the spout of FIG. 2, FIG. 4 schematically shows an embodiment of the sealing device according to the invention, FIG. 5 schematically shows the susceptor element and inductor of FIG. 4, FIG. 6 schematically shows a cross section of a jaw including the susceptor element and inductor, FIG. 7 schematically shows a cross section of a jaw including the susceptor element, inductor, and resilient backing layer of the susceptor element, FIGS. 8A,B, C schematically shows the electromagnetic field generated by the jaw of FIG. 4 and the interaction with the susceptor element, FIG. 9 shows an alternative design of the inductor, FIG. 10 shows yet another alternative design of the inductor, FIG. 11 illustrates schematically the operation of a continuous motion sealing device.

FIG. 1 schematically depicts a pouch production machine and related operating method according to the invention for the production of collapsible pouches made from heat-sealable film material. Throughout the figures, the pouch production machine is referred to with reference numeral 1.

The pouch production machine 1 is configured to produce collapsible pouches 100 comprising a plastic spout 150 or other fitment, e.g. standing collapsible pouches. The spout 150 is pre-made, e.g. by injection molding.

The pouch production machine 1 has a frame (not shown) provided with a film supply device 10 that is adapted to receive one or more rolls 11 of flexible heat-sealable film material 12. In the pouch production system 1, the film material 12 is unwound from the roll 11.

The pouch production machine 1 comprises a folding device 13 to fold the film material 12 dispensed from a single roll into a folded shape.

In the depicted exemplary embodiment, the folded film material 12 travels downward in a vertical direction (V). In another design the folded film material could travel horizontally.

The folding device 13 is configured to fold the film material 12 such, that a fold-line is provided on one, here vertical, side of the folded film material 12. By means of the fold line, the film material 12 is formed into a first pouch wall 101 and an opposed second pouch wall 102, in order to define an interior of the pouch 100 in between them. In another embodiment the film material is folded into a gusset, e.g. to form a gusset bottom or a side gusset of the pouch.

After folding, the film material travels along a first heat sealing device 20. The first heat sealing device 20 is aligned parallel to the vertical direction (V) and is aligned with outer side seam regions of the folded film material 12, being located opposite to the fold line.

The first heat sealing device 20 is configured to weld the vertical seam regions of the pouch walls 101, 102 that are located opposite to the fold line, such that the film material 12 attains a flattened tubular shape.

Downstream of the first heat sealing device 20, here just below the device 20, the pouch production machine 1 comprises a second heat sealing device 21. The second heat sealing device 21 is aligned perpendicular to the vertical direction (V), e.g. parallel to a horizontal direction (H).

The second heat sealing device 21 extends across the width of the folded film material 12 and is configured to weld a bottom seam of the pouches 100 to be made.

The pouch production system 1 comprises a film conveyance device 30 configured to move the folded film material 12 in the direction (V) along the first heat sealing device 20 and subsequently along the second heat sealing device 21.

A cutting device 14 is provided to separate a pouch 100 from the folded film material 12 by making a horizontal cut across the width of the folded and now sealed film material. The cut extends close to the bottom seam, so that the individualised pouch 100 has a non-bonded upper edge.

In the depicted embodiment, the film conveyance device 30 moves the folded film material in a stepwise manner along the stationary first and second heat sealing devices 20, 21. At the relevant position in front of the first heat sealing device 20, the film material 12 is held to form the first weld opposite to the fold line. Simultaneously, the film material 12 is held at a relevant location in front of the second heat sealing device 21 to form the second weld at the bottom of the pouch 100.

In an embodiment one or more of the first heat sealing device 20 and the second heat sealing device 21 comprises a first jaw and a second jaw for heat sealing the material 12.

The production machine 1 is embodied with a horizontal conveyance mechanism 40 that is configured to convey individual pouches 100 along a path of conveyance, wherein the sealing station E" as discussed herein as well as one or more other stations A, B, C, D, E' are arranged along this path of conveyance. The depicted conveyance mechanism is configured and operated to convey in an intermittent motion pattern, so stepwise. Often a so-called walking beam conveyance mechanism is employed for stepwise conveyance.

The sealing action is then, concurrently with one or more other activities at one or more other stations of the machine 1, performed with the pouch 100 at rest.

The sealing station E" is mounted stationary in the machine 1, at least with regards to the direction of conveyance.

The mechanism 40, for example, is a walking beam mechanism having pairs of grippers 41 in a horizontal array. Herein each pair of grippers 41 is embodied to grip opposed side or corner regions of the pouch, with the open top directed upwards. The pair of grippers 41 is actuable in this example, allowing the spacing between the grippers 41 to be altered for opening and closing of the open top region of the pouch.

Below the cutting device 14 an individualized pouch 100 is gripped by a set of grippers 41.

At station A of the machine 1, grippers 41 are moved towards one another, to open the top of the pouch 100, more specifically to open the non-bonded upper edge.

At station B, an opener 15 is introduced into the top of the pouch 100 to further open the non-bonded upper edge of the pouch 100.

Station C is a filling station, where a product, e.g. a liquid and/or solid product, is filled into the pouch 100 by a filling device 16 via the non-bonded upper edge.

At station D, the grippers 41 are moved away from one another, to somewhat close the non-bonded upper edge of the pouch 100 after the filling.

Station E is, at least in the present embodiment, a combined spout inserting station E' where a spout inserting device 50 is adapted to insert an attachment portion of a spout 150 in the non-bonded edge region, and a spout sealing station E".

Before we address the spout sealing station E" we will first discuss the exemplary embodiment of the plastic spout 150 which is depicted in more detail in FIGS. 2 and 3.

The plastic spout 150 has an attachment portion 151 with thin sealing walls 152,153 that depend from a transverse wall 154 of the spout body. The spout 150 further comprises a tubular neck 155 extending upwards from the transverse wall 154 and forming a product passage for the dispensing of product from the pouch 100 via a mouth.

The sealing walls 152, 153 may have a thickness of less than 2 mm in practical embodiments.

Preferably, as shown, the sealing walls 152, 153 are smooth on their sealing faces, so lacking any relief that keeps the film material locally away from the sealing wall in the desired region of the join.

As discussed a closure, e.g. a cap, may be mounted on the spout 150, e.g. after the filling or in the form of a pre-assembly of the spout 150 and the closure.

Instead of a spout 150 another fitment may also be contemplated in the context of the present invention.

FIG. 3 depicts the situation wherein the spout 150 has been sealed in the upper edge region of the spout at station E". Herein the entire upper edge region has been sealed in one sealing cycle along with sealing the spout 150 to the pouch.

Herein, reference numeral 110 indicates the fold line, forming a vertical side of the pouch 100 in this example. Reference numeral 111 indicates the side seam of the pouch 100 made by station 20.

Reference numerals 101 and 102 indicate the opposed first and second walls of the pouch 100.

Reference numeral 113a indicates a portion of the top seam, and reference numeral 113b another portion of the top seam. Reference numeral 113c indicates the part of the top seam where the spout 150 is received and sealed.

In FIG. 4, an embodiment of an spout sealing station E" is displayed schematically in more detail, partially in exploded-view along with the pouch 100 and spout 150 that has already been sealed in the upper edge region thereof.

The spout sealing station E" comprises:
an impulse sealing device comprising a first jaw 210 and a second jaw 220,
an actuator device, here with actuator 201 for jaw 210 and actuator 202 for jaw 220, configured to move the first and second jaws 210, 220 relative to one another between an opened position and a clamped position,
a cooling device 300 configured to cool each of the first and second jaws 210, 220.

The first jaw 210 has a first contoured front surface configured to contact the edge region of a respective first wall 101 of the pouch.

The second jaw 220 has a second contoured front surface configured to contact the edge region of a respective second wall 102 of the pouch.

The first and second contoured front surfaces each have a recessed face portion defining a recess R configured to receive therein a half of the attachment portion 151 of the spout 150.

The first and second contoured front surfaces each define, on opposite sides of the respective recessed face and adjoining said recessed face, coplanar face portions.

Each of the first and second jaws 210, 220 comprises at the respective contoured front surface thereof one single elongated, impulse heatable member 212, 222 that extends along the recessed face portion and the coplanar face portions of the respective front surface and that is covered by a heat-resistant non-stick covering (not shown in FIG. 4 for clarity).

The sealing station E" is configured to perform an impulse sealing cycle as discussed herein, so that the spout 150 is sealed in the upper edge region and, as preferred, the entire upper edge region of the pouch 100 is hermetically sealed.

In the cycle, the actuator device 201, 202 is configured to bring the first and second jaws 210, 220 into the clamped position, so that—in the edge region—the first and second walls 101, 102 are clamped against the attachment portion 151 by the recessed faces of the first and second jaws and so that—in the edge region—the first and second walls 101, 102 on opposite sides of the spout 150 are clamped against one another by the coplanar faces of the first and second jaws 210, 220.

Each impulse heatable member is a susceptor element 212, 222 comprising electrically conductive material. Each susceptor element has a rear side facing away from the respective contoured front surface of the jaw.

Each of the first and second jaws 210, 220 comprises an inductor 211, 221 which is electrically insulated from the respective susceptor element 212, 222. The inductors each comprises an elongated inductor section, here one pair of inductor sections, that extends along the respective contoured front surface at the rear side of the respective susceptor element.

The sealing station E" further comprises a high frequency alternating electric current source 250, which is connected to the inductor 211, 221 of each of the first and second jaws 210, 220. In an embodiment, both the inductors 211, 212 are connected to one and the same source 250.

The sealing station E" is configured to perform an impulse sealing cycle. Once the jaws 210, 220 have been moved into the clamped position as indicated above, the electric current source 250 is operated to temporarily feed a high frequency electric current to the inductors 211, 221. This generates a high frequency electromagnetic field by means of the inductors. In turn the high frequency electromagnetic field induces eddy currents in the respective susceptor element 212, 222 generating an brief and vehement impulse of heat that is emitted by the susceptor element 212, 222. These impulses of heat seal the edge region of the walls 101, 102 to the sealing faces of the attachment portion 151 and to each other in the portions 113*a*, *b* of the upper edge region.

So the station E" temporarily energizes the susceptor elements 212, 222 on the basis of induction, so as to generate an impulse of heat that is emitted by each of the elements 212, 222.

The first and second jaws 210, 220, at least the susceptor elements 212, 222 thereof, cool down after termination of the energizing assisted therein by operation of the cooling device 250.

The actuator device 201, 202 is configured to move the first and second jaws 210, 220 into the opened position after the cooling down has taken place in satisfactory manner.

It is shown in FIGS. 4 and 5, that in each jaw 210, 220 there is just one pair of elongated inductor sections 221*a*, *b* that are parallel to one another and vertically spaced from one another by a horizontal slit 221*c*. The pair of inductor sections is arranged in proximity of the rear side of the susceptor element.

In an embodiment, the elongated inductor section 221*a*, *b* is made from a metal, e.g. of copper.

It is shown in FIGS. 4 and 5, that the at least one elongated inductor section 221*a,b* is a solid cross-section metal or other, preferably high conductivity material inductor section, e.g. made of copper which is preferred. This arrangement allows to avoid undue variations of current density within the inductor section, and thereby undesirable variation in the generated field, e.g. compared to an internally hollow inductor section.

It is shown in FIGS. 4 and 5, that the at least one elongated inductor section 221*a,b* has a constant cross-section, preferably a solid cross-section, over its length along the contoured front surface of the respective jaw. This design avoids undue variations of current density within the inductor section, which might otherwise occur at locations where the cross-section changes, and thereby undesirable variation in the generated field.

It is shown in FIGS. 4 and 5, that the uniform cross-section elongated inductor section 221*a*, *b* has, seen in a top view onto the jaw, a shape corresponding to the contoured front surface of the jaw and maintains a uniform distance between the susceptor element 222 and the elongated inductor section 221*a,b*. This arrangement enhances uniformity of the development of heat in the susceptor element.

In alternative embodiments, the inductor may have a non-constant cross-section, for example locally having a cross-section that is narrower than a nominal cross-section, to increase locally the current density for the high-frequency electric current, in order to locally increase the intensity of the heat impulse emitted by the susceptor element.

In embodiments, the distance between the inductor and the susceptor element may locally vary from the uniform, e.g. nominal distance between the inductor and the susceptor element. With a distance that is locally narrower, for example, the electric magnetic field in the susceptor is increased locally, in order to locally increase the intensity of the heat impulse emitted by the susceptor element.

The horizontal slit 221*c* can be air slit or a slit filled with electrically insulating material.

In embodiments, said slit 221*c* between neighbouring inductor sections 221*a*, *b* that are arranged above one another has a height between 0.01 and 5 mm, more preferably between 0.1 and 2 mm.

The presence of the slit 221*c* between the parallel elongated inductor sections 221*a*, *b* allows for a desirable concentration of the field that is generated by the inductor of the jaw onto the susceptor element 222. This is illustrated in FIGS. 8A,B, and C.

As explained herein, the field is fairly homogenous, which enhances homogeneity of the impulse heating of the susceptor 222 and thereby the quality and reliability of the sealing process. In particular, undue variations in temperatures to which the film material is subjected are avoided, which would otherwise arise if the field were irregular.

Figure 1:
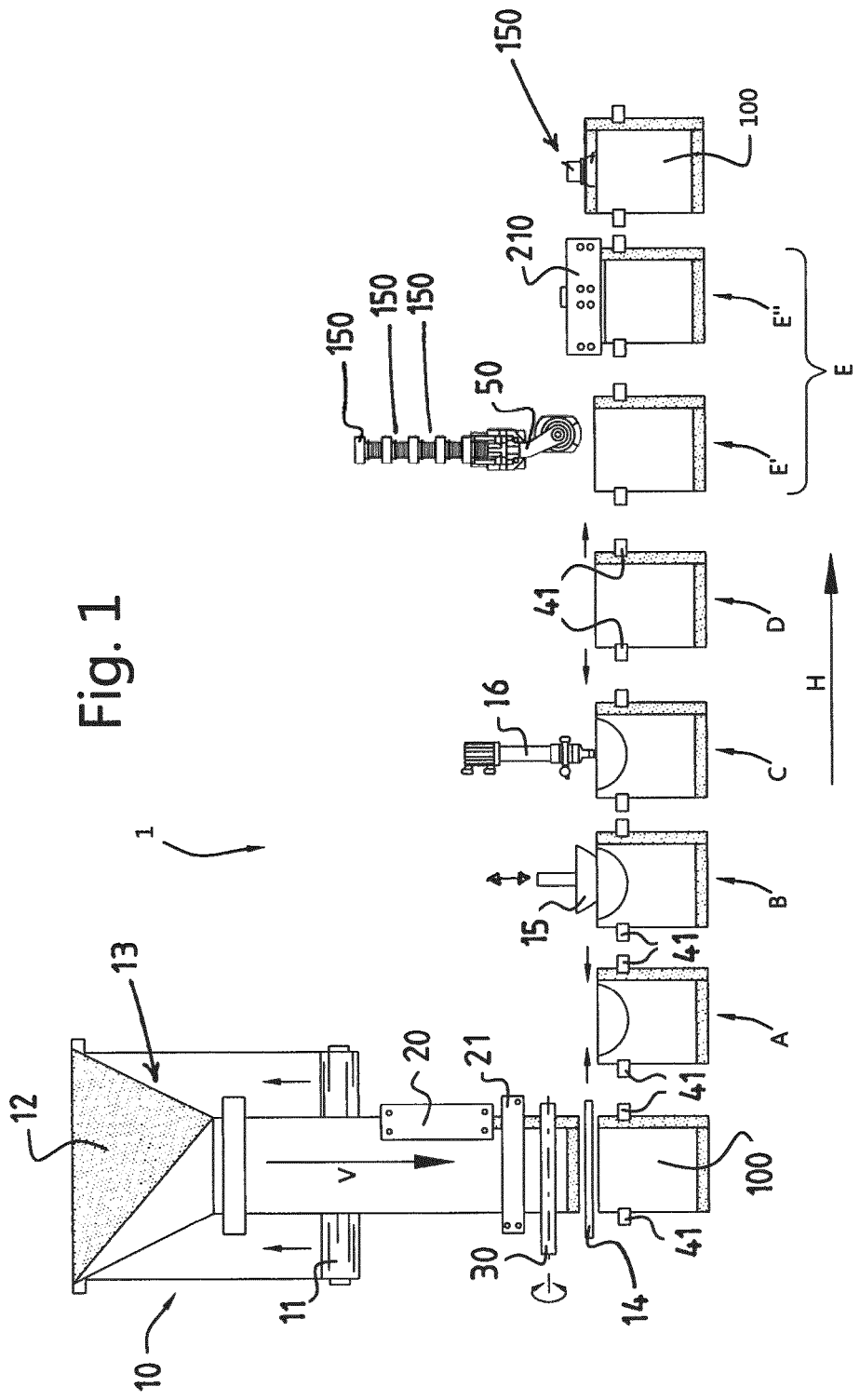
Figure 2:
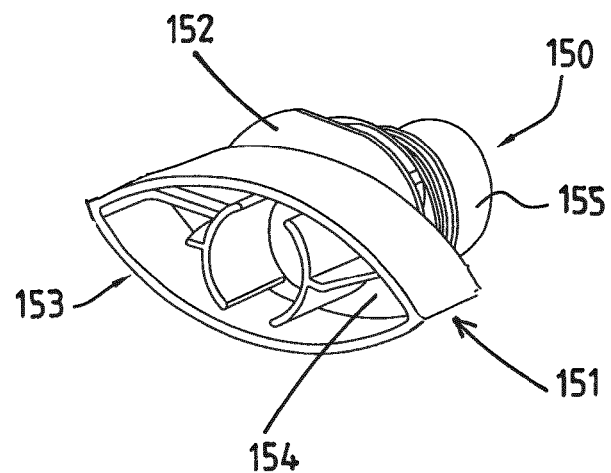
Figure 3:
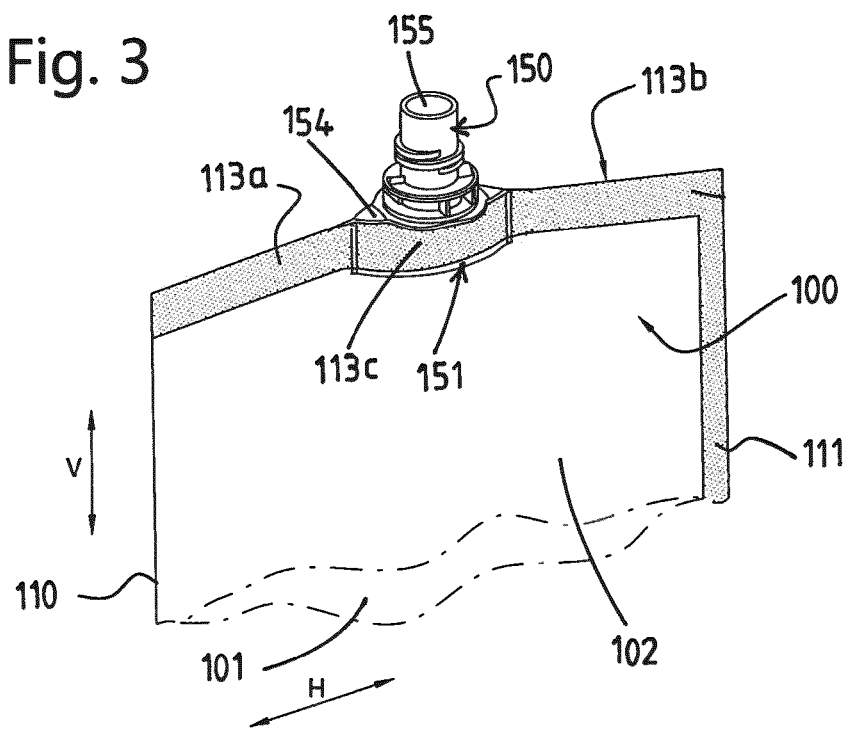
Figure 4:
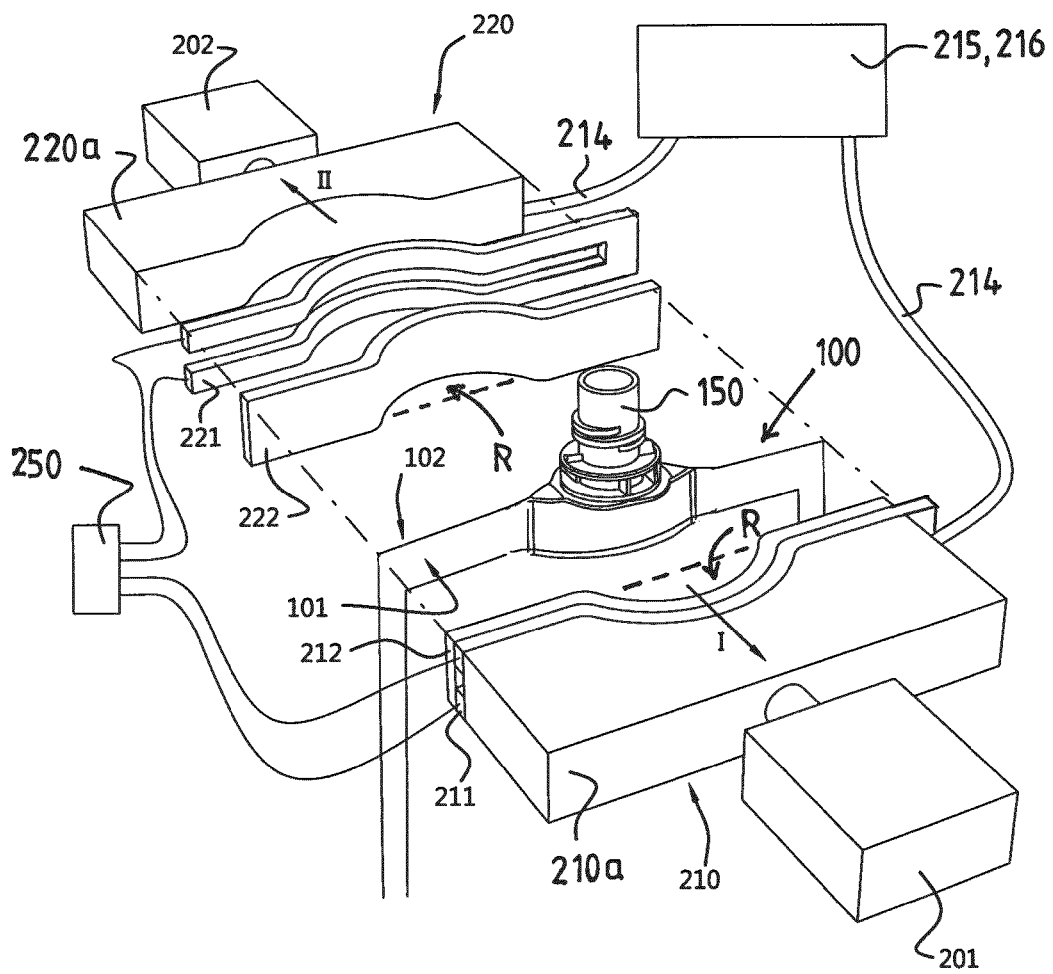
Figure 5:
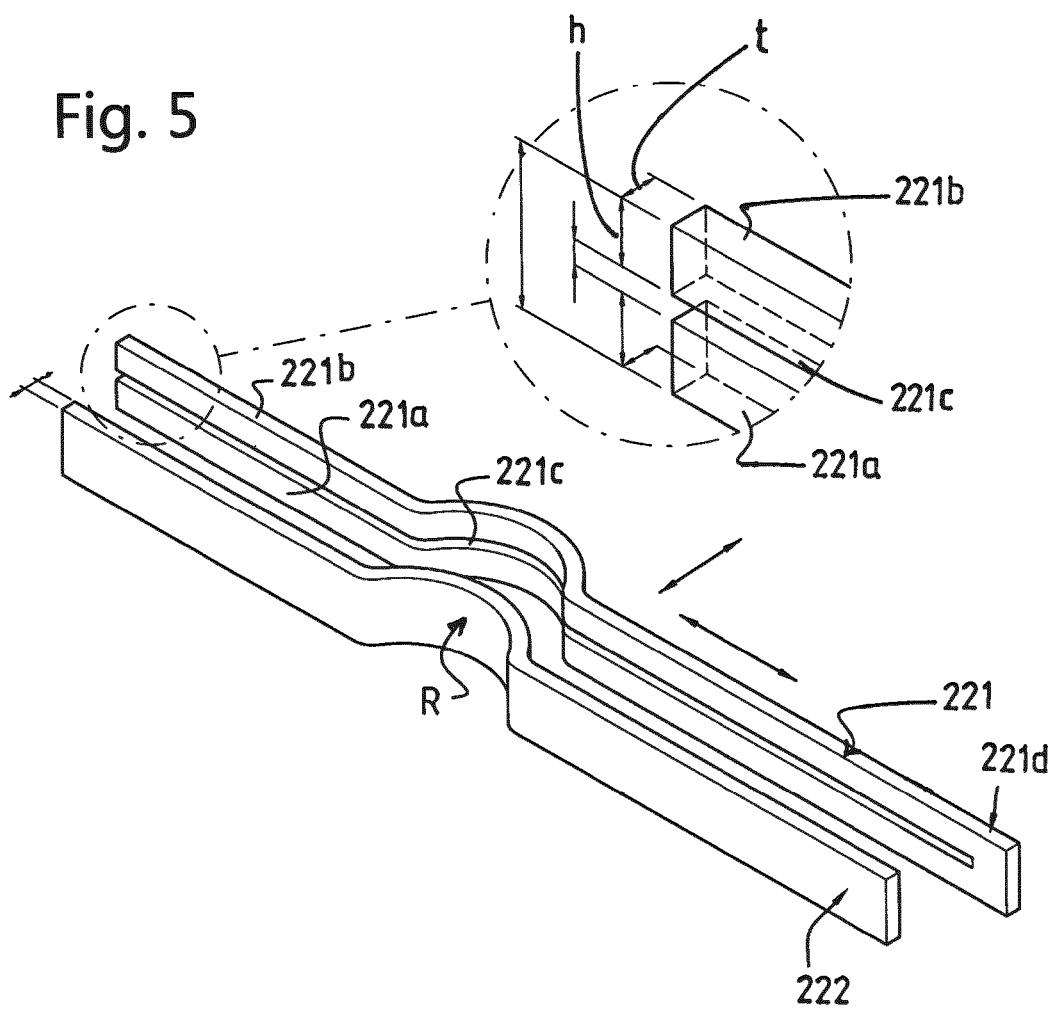

It is shown in FIGS. 4 and 5, that the susceptor element 222 extends, seen in a view onto the front surface of the jaw, over the horizontal slit 221*c* between the parallel inductor sections 221*a,b*.

It is shown in FIGS. 4 and 5, that the susceptor element 222, seen in a view onto the front of the jaw, extends over the slit 221*c* between parallel elongated inductor sections 221*a,b* and overlaps in said view with each of the parallel inductor sections.

It is shown in FIGS. 4 and 5, that the susceptor element 222 is embodied as one strip that extends over the slit 221*c* between parallel elongated inductor sections 221*a,b* and overlaps in said view with each of the parallel inductor section.

It is shown in FIGS. 4 and 5, that a strip shaped susceptor element 222 has an upper edge and a lower edge defining a height of the strip, wherein the height of the strip is at least 50% of the height of the single pair of inductor sections 221*a*, *b* including the slit 221*c* that are arranged at the rear of the strip above one another, e.g. between 75% and 125% of said height, e.g. about 100% of said height.

It is shown in FIGS. 4 and 5, that a strip shaped susceptor element 222 has an upper edge and a lower edge defining a height of the strip, wherein the inductor of a jaw comprises a number of, e.g. multiple, inductor sections 221*a*, *b* that each extend along the rear side of the susceptor element. Herein the height of the strip is preferably at most the same as the height of the number of one or more inductor sections, preferably the upper edge and the lower edge of the strip not protruding above and below the height of the one or more inductor sections.

It is shown in FIGS. 4 and 5, that the inductor of a jaw is embodied so that in a pair of adjacent and parallel inductor sections 221*a*, *b* arranged at the rear side of the susceptor element 222, the current flows in opposite directions through the inductor sections.

It is shown in FIGS. 4 and 5, that the inductor of a jaw comprises a C-shaped inductor element having parallel first and second inductor sections interconnected at one axial end of the inductor, e.g. by a connecting portion 221*d* integral with the inductor sections, in series, wherein the free ends of the inductor sections have terminals for electrical connection to the current source. The connection portion 221*d* is, as preferred, located outside the region where the susceptor element 222 is located, as the connector portion 221*d* is likely to show irregular field effects that might lead to non-homogeneity of the heating of the susceptor element.

It is shown in FIG. 4, that the first and the second jaws are each provided with one C-shaped inductor element, having parallel first and second inductor sections interconnected in series, wherein the free ends of the inductor sections have terminals for electrical connection to the current source 250.

It is shown in FIGS. 4 and 5, that the inductor of a jaw comprises a C-shaped inductor element having parallel first and second inductor sections 221a,b interconnected in series and arranged above one another, wherein the inductor sections are separated by a horizontal slit 221c, e.g. an air slit or a slit filled with electrically insulation material.

It is shown in FIGS. 4 and 5, that the inductor of a jaw comprises multiple, e.g. just two, elongated inductor sections 221a,b arranged parallel to one another and arranged above one another behind the susceptor element 222.

In an embodiment the at least one elongated inductor section 221a, b has a thickness "t" of between 1.0 and 4.0 mm, seen perpendicular to the front surface of the jaw, for example between 1.5 and 3.0 mm. The limited thickness of the inductor element enhances the cooling of the jaw, including the inductor of the jaw, e.g. as one or more cooling fluid ducts are preferably arranged in proximity of a rear side of the at least one inductor element.

In an embodiment the at least one elongated inductor section has a rectangular cross-section with a height "h" that is greater than the thickness "t" of the inductor section. This arrangement allows to limit the thickness, which allows for efficient cooling.

Figure 6:
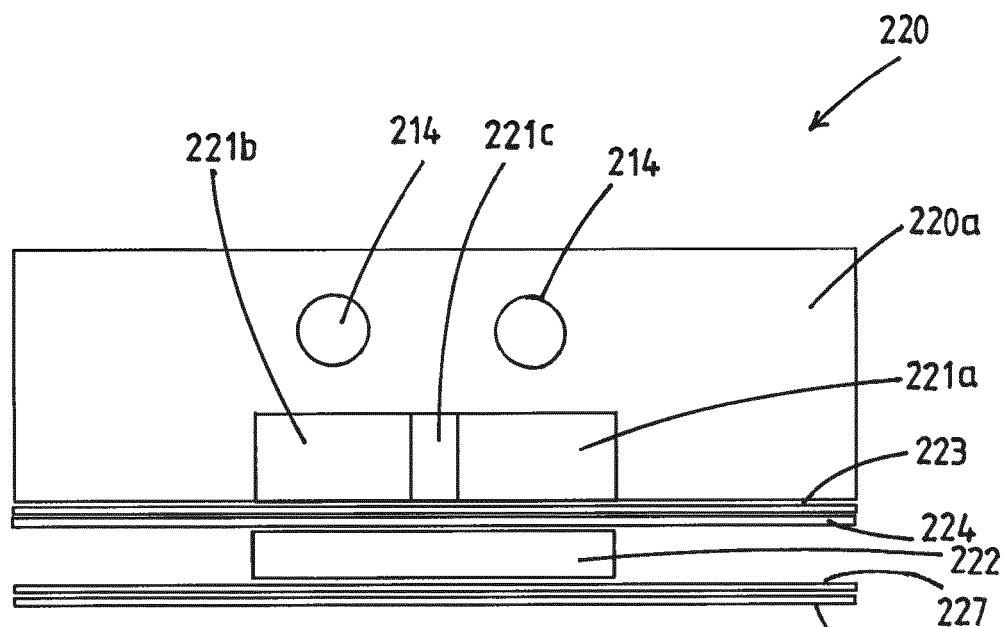

It is shown in FIGS. 4 and 6, that each jaw may be provided with one or more cooling fluid ducts 214, e.g. the cooling fluid being a cooling liquid, e.g. water, being passed through the cooling fluid ducts, e.g. using a pump assembly 215, e.g. a cooling liquid circuit being a closed circuit including a heat exchanger 216 configured to remove heat from the cooling liquid.

Preferably, no cooling fluid is passed in a region between the inductor and the susceptor as that would unduly increase the distance between them and would impair effectivity of the impulse heating induced by the field. It will be appreciated, that in view of the desired very close proximity of the susceptor element to the front surface of the jaw, there is in practice no space for any cooling duct in said region. So, in practical embodiments, cooling of the jaw is preferably done using a control flow of cooling fluid, e.g. liquid, through one or more ducts that are arranged behind, and preferably in close proximity to, the inductor sections.

In an embodiment, at least one cooling fluid duct 214 extends along the at least one inductor section 221a, b that extends along the rear side of the susceptor element 222.

It is preferred for the machine 1 to be configured such that cooling of the jaws 210, 220 is active during the entire impulse sealing cycle, so also during the creation of the heat impulse which happens so fast that it is generally not impaired by the cooling. In another configuration the cooling may be interrupted or reduced around the moment of the heat impulse.

The cooling of the jaws 210, 220 may, as preferred, be configured to cause cooling of the heat-sealed edge region before the jaws 210, 220 are opened, e.g. the film material and fitment 150 in the fused region being cooled to below 60° C. before opening, e.g. to below 40° C.

A benefit of the cooling is that, before the release from the jaws 210, 220, the sealed region of the pouch 100 will acquire a strength and rigidity that is greater than in absence of such cooling. This, for instance, may allow for an increased production speed of the machine 1 wherein higher forces may be exerted on the walls of the pouch 100, e.g. in view of transport of the pouch or string of interconnected pouches through the machine. Undue stretching of the pouch, e.g. in the area of the fitment seal, is preventable to a large degree by use of the invention disclosed herein.

In an embodiment, the susceptor element 212, 222 is made of metal material, e.g. a metal or a metal alloy, e.g. of a thin metal strip.

For example, the susceptor element 212, 222 is made of, or comprises, aluminium, nickel, silver, stainless steel, molybdenum and/or nickel-chrome.

It is shown in FIGS. 4 and 5, that the susceptor element 212, 222 is embodied as a strip having opposed front and rear main faces that define the thickness of the strip between them.

In an embodiment, the thickness of the susceptor element strip 212, 222 is constant over the extension of the strip.

In embodiments, the thickness of the susceptor element may differ locally from a nominal thickness. For example, the susceptor element may comprise a thickened portion at its rear surface, e.g. facing away from the front surface of the jaw, to locally increase the intensity of the electromagnetic field in the susceptor element, in order to locally increase the intensity of the heat impulse that is emitted by the susceptor element.

It is shown in FIGS. 4 and 5, that the susceptor element 212, 222 is embodied as a planar strip, most preferably the jaw having a single planar strip susceptor element. This arrangement as a planar strip is in particular preferred for the handling of plastic fitments that have an attachment portion with planar and preferably smooth sealing faces.

It is shown in FIG. 4, that the plane of the susceptor element 212, 222 is parallel to the plane of the sealing face of the attachment portion 151. The preferred smoothness of the sealing faces 152,153 of the portion 151, so the absence of a relief that locally holds the wall of film material away from the sealing face and creates air pockets between the wall 101, 102 and the sealing face, causes a very effective transfer of the heat impulse from the jaw 210, 220 to the zone where the joint is made. In practice it can be observed that a joint is achieved through the entirety of the area where the susceptor 212, 222 emits heat towards the sealing face of the attachment portion.

It is shown in FIGS. 4 and 5, that the susceptor element 212, 222 is a strip, e.g. of a metal, e.g. of aluminium, wherein the height of the strip is between 3 and 10 millimetres, e.g. between 4 and 8 millimeters. It is shown in FIG. 4, that the strip has a constant height over its length.

In an alternative embodiment, the height of the susceptor element may be non-constant. For example, a lower edge of a susceptor element in a jaw of a fitment sealing station may be upwardly curved in a central, e.g. at a part that is configured to abut an attachment portion of a fitment during use, to effect that lees heat is transferred to a lower edge of the attachment portion and the air below. This improves the rate at which the seal can be cooled, since the air would otherwise act as an insulator, e.g. reducing the cooling rate.

It is shown in FIGS. 4 and 5, that the susceptor element 212, 222 strip lacks apertures over its extension.

It is shown in FIGS. 4 and 5, that the jaws 210, 220 are each provided with a single continuous susceptor element 212, 222 embodied as a strip, e.g. of metal.

It is shown in FIGS. 4 and 5, that the susceptor element 222, e.g. embodied as a strip, has a thickness of between 0.01 and 5 mm, preferably between 0.05 and 2 mm, more preferably between 0.08 and 0.8 mm, e.g. of between 0.08 and 0.5 mm. In general, it is considered desirable to have a minimum thickness of the susceptor element in view of the desire to rapid cool the jaw, including the inductor and the susceptor, after termination of the heat impulse. A thin design of the susceptor, contributes to this desire. It is noted that, in contrast to the impulse sealing device addressed in the introduction, no electric current from a current source is passed through the susceptor, so the cross-section need not be designed to deal with such a current flow.

It is shown in FIGS. 4 and 5, that the jaw is provided with a single continuous susceptor element 222 embodied as a strip, e.g. of metal, having a height of the strip between 3 and 10 millimetres, e.g. between 4 and 8 millimeters, and a thickness of between 0.08 and 0.8 mm, e.g. of between 0.08 and 0.5 mm. For example, the strip is made of aluminium material.

In embodiments, the frequency of the electric current supplied by source 250 to the inductors 211, 221 of the jaws 210, 220 is between 100 kHz and 1 MHz, for example between 250 KHz and 750 KHz.

In embodiments, the magnitude of the electric current supplied by source 250 to the inductors 211, 221 of the jaws 210, 220 is between 20 A and 600 A.

In embodiment, the electric current is supplied by source 250 to the inductors 211, 221 of the jaws 210, 220 at a voltage with a magnitude between 40 V and 500 V.

It is shown in FIGS. 4 and 8A-C, that a jaw 210, 220 is embodied such that the high frequency electromagnetic field generated by the inductor 211, 221 primarily causes the very rapid development of heat within a frontal skin layer of the susceptor element 212, 222 due to the so-called skin effect. The skin effect is the tendency of an alternating electric current to become distributed within a conductor such that the current density is largest near the surface of the conductor and decreases, exponentially, with greater depths of the conductor. At high frequencies the skin depth becomes smaller. This depth may, for example, be 0.15 mm for an aluminium susceptor element if the frequency of the field is 350 KHz. The thickness of the susceptor element is envisaged to be more than this skin depth, yet not too much for the reason addressed herein.

It is shown in FIG. 4, that the spacing between the rear of the susceptor element 212, 222 and the neighbouring inductor section(s) is at a minimum 0.025 mm, or 0.05 mm, or 0.1 mm and at a maximum 3.0 mm, or 2.0 mm, or 1.0 mm. The minimum values of this spacing are primarily envisaged to allow for effective electrical insulation between the inductor section(s) on the one hand and the susceptor element on the other hand. In embodiments, it is envisaged that this spacing is only filled with electrically insulating material. The maximum value of this spacing is primarily envisaged to have the inductor section(s) in close proximity to the rear of the susceptor element, wherein a maximum of 1.0 mm is preferred. In a practical embodiment this spacing may be 0.05 mm. So this spacing may in practical embodiments be less than the thickness of the susceptor element itself.

Preferably, the entire spacing between the rear of the susceptor element and the neighbouring inductor section(s) is filled with electrically insulating material.

FIG. 6 illustrates that the spacing between the rear of the susceptor element 222 and the neighbouring inductor section 221 is filled with one or more layers of electrically insulating tape, for example at least a layer of Kapton 223 and a layer of Teflon 224, for example just one layer of Kapton tape and one Layer of Teflon tape.

In an embodiment the electrical insulation between the rear of the susceptor element and the neighbouring inductor section(s) has a thickness of between a minimum of 0.025, or 0.050, or 0.1 mm, and a maximum of at most 3.0 mm, or 2.0 mm.

In an embodiment the anti-stick layer 226 at the front of the jaw is embodied as a layer of Teflon tape. In another embodiment the anti-stick layer could comprises glass or the like.

FIG. 6 illustrates that the front face of the susceptor element 22 is covered by at least one layer of electrically insulating material 227, e.g. Kapton, e.g. Kapton tape, e.g. having a thickness of between 0.01 and 0.05 mm, e.g. of about 0.025 mm.

In an embodiment the spacing between the front surface of the jaw and the susceptor element is at a minimum 0.025 mm, or 0.050 mm, and at a maximum 2.0 mm, or 1.0 mm, or 0.5 mm. Herein, the minimum spacing may be governed by the presence of an anti-stick layer 226. The anti-stick layer can be coated onto the jaw, e.g. onto the susceptor element, e.g. a glass or Teflon coating.

In an embodiment, the spacing between the front surface of the jaw and the susceptor element is filled with at least one, e.g. multiple layers of electrically insulating material, e.g. tape, for example at least a layer of Kapton tape 227 and a layer of Teflon tape 226 as anti-stick layer forming the front surface of the jaw, for example just one layer of Kapton tape and one Layer of Teflon tape.

It is shown in FIGS. 4 and 5, that the contoured front surface of the jaws 210, 220 is smooth in a region of contact with the walls 101, 102 of film material, so lacking any relief that would locally keep the film material away from the front surface, so lacking for example one or more ribs, bosses, etc. This arrangement is preferred in conjunction with a smooth design of the sealing faces 152, 153 of the attachment portion 151. Preferably, the smooth region of contact of the front surface of the jaws is designed to be parallel to the sealing surface of the attachment portion 151 that is to be joined to the walls of film material.

It is shown in FIG. 4, that the jaws 210, 220 are configured, e.g. have a length, so that the entire non-bonded edge region in which the spout 150 is inserted, e.g. by an inserter 50 of the machine 1, is sealed in one cycle by the operation of the jaws. So both the spout 150 is secured in the edge region and the entirety of the edge region is sealed closed. This avoids the needs for additional sealing actions along said edge region.

It is shown in FIG. 4, that the recessed face portion of each jaw 210, 220 is curvaceous over its entire longitudinal extension.

It is shown, that both jaws 210, 220 have a main body 220a, e.g. of plastic or ceramic material, e.g. a heat-resistant material, e.g. of PEEK, on which the susceptor element and the inductor are mounted. The plastic or ceramic material is selected to not impair the field that is generate by the inductor, at least not in an undesirable manner. Boron nitride and/or Aluminium nitride, Polyphenylene sulphide (PPS), vulcanized silicone materials can be considered as well for the main body. In particular Boron nitride may provide for a good thermal conductivity, thereby enabling a good conductivity of heat from the susceptor element towards the cooling device, e.g. towards the cooling fluid.

One or more cooling ducts 214 are provided, e.g. machined, in a main body, e.g. of PEEK. For example, one or both jaws 210, 220 have a main body, having a main body front side into which one or more grooves are made in which the one or more induction sections are arranged. In embodiments the susceptor element is arranged over the main body front side, as discussed herein relative to the one or more inductor sections. Herein, one or more layers of electrically insulation material are arranged between the inductor section(s) and the susceptor elements, e.g. of Kapton and/or Teflon. One or more further layers of electrically insulation material as well as an outer anti-stick covering are mounted over the susceptor element to from the front surface of the jaw.

In embodiment, the sealing device of station E" is configured to generate a heat impulse with the susceptor elements 212, 222 of between at least 150° C. and at most any of 200° C., 300° C., 400° C., or 500° C. measured on the susceptor element.

In an embodiment, the heat impulse duration lies between 10 and 1000 milliseconds, e.g. between 20 and 500 milliseconds, e.g. between 75 and 400 milliseconds.

In an embodiment the cycle includes a clamped cooling phase directly following the heat impulse during which the jaws 210, 220 are maintained in clamped position, which clamped cooling phase may have a duration between 200 and 800 milliseconds, e.g. between 300 and 600 milliseconds.

It is noted that control of the temperature that is reached during the impulse heating may be done on the basis of monitoring and controlling the supply of electrical power to the inductors and/or by monitoring and controlling the temperature and/or flow rate of cooling fluid, e.g. water, e.g. water at more or less ambient temperature, circulated along the respective jaws.

The production machine 1 is primarily envisaged for production of pouches from metal-free film material. For example, the film material of the walls is a multi-layer material where one and the same plastic, but with different properties, is found in all layers. In another embodiment the wall is a monolayer wall. The absence of a metal layer allows for more effective recycling.

Figure 7:
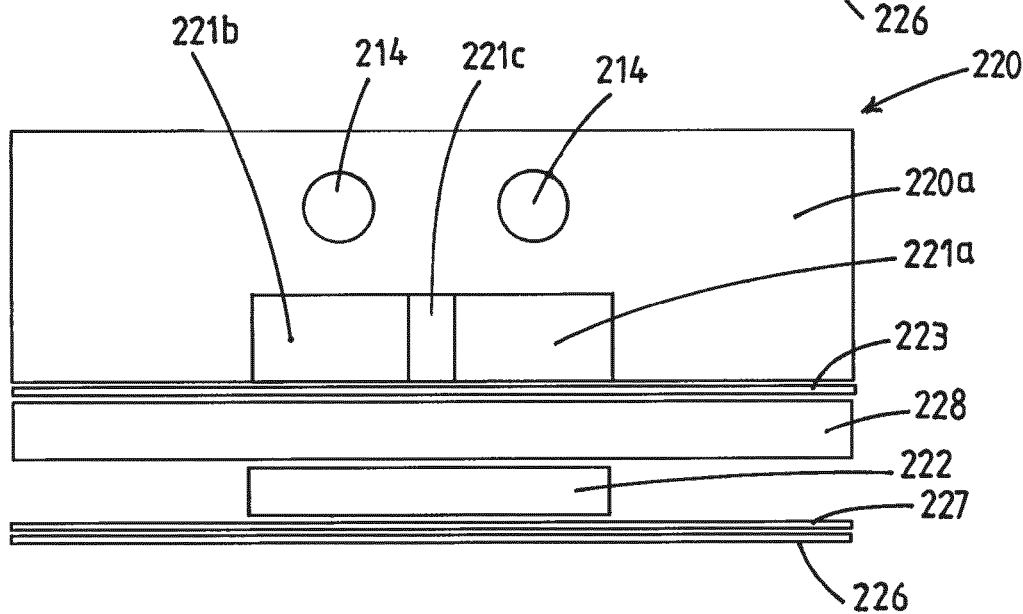
Figure 8A:
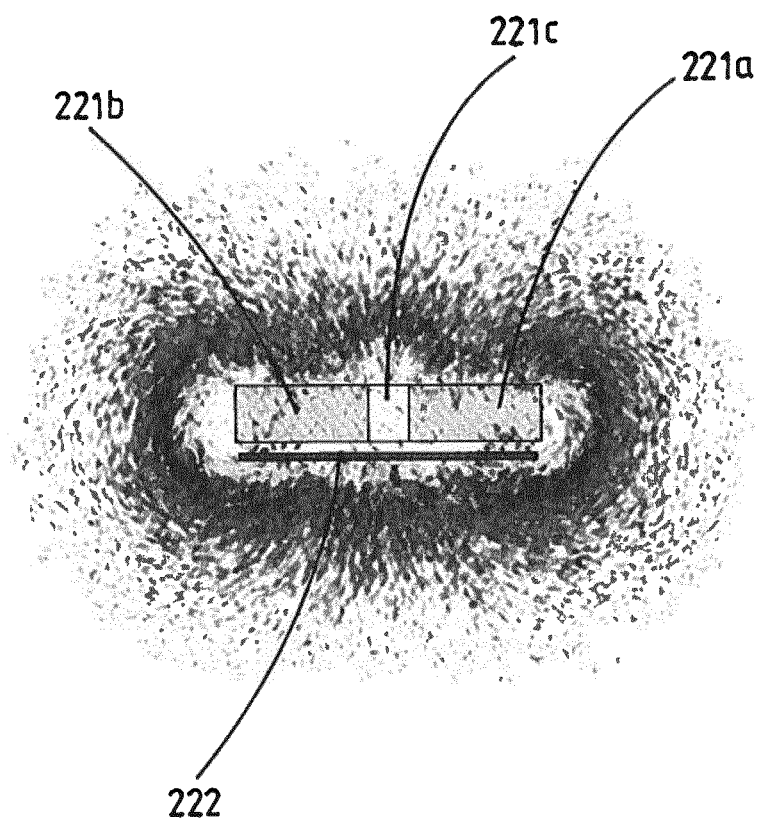
FIG. 8B illustrates the strength and distribution of the field when seen from above onto the front of a jaw, wherein the field is indicate with FLd and is shown in relation to the inductor 221 and susceptor 222.
FIG. 8C illustrates the strength and distribution of the field of FIG. 8B in a perspective view.
Figure 8B:
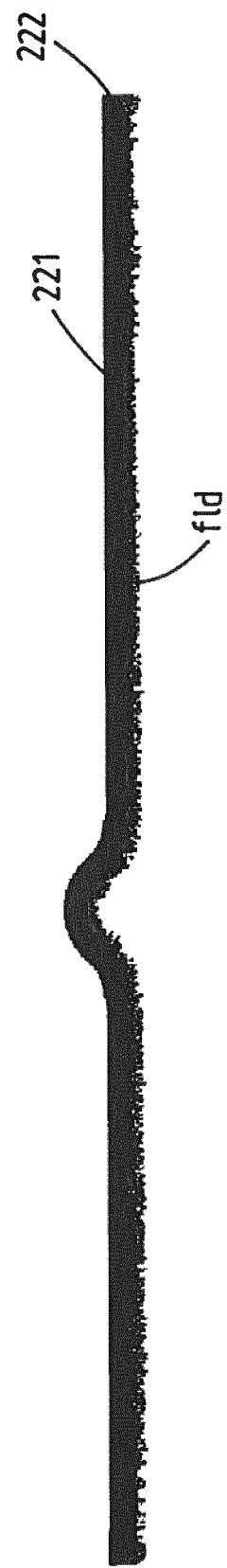
Figure 8C:
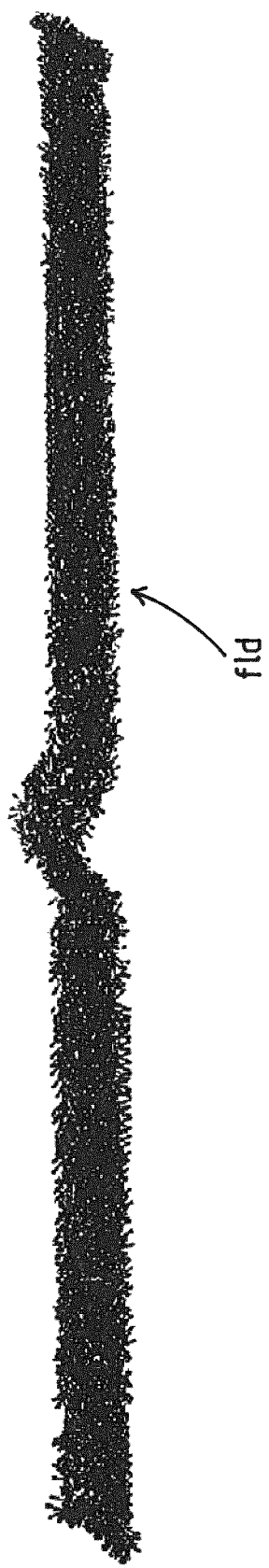

FIG. 7 illustrates that in case of a pouch with one or more side gussets, the edge region where the fitment is to be mounted may include a so-called triple point. In such a situation it can be advantageous to provide a resilient backing layer 228, e.g. of vulcanized silicone rubber and/or Teflon, behind the susceptor element 222, thereby allowing for the jaw front to accommodate for a local variation of the number of film material walls. For example, the resilient layer 228 has a thickness between 0.1 and 2.0 millimeter. Herein it is understood that the thin susceptor element 222 is able to flex so as to accommodate the local variation in the number of walls.

Figure 9:
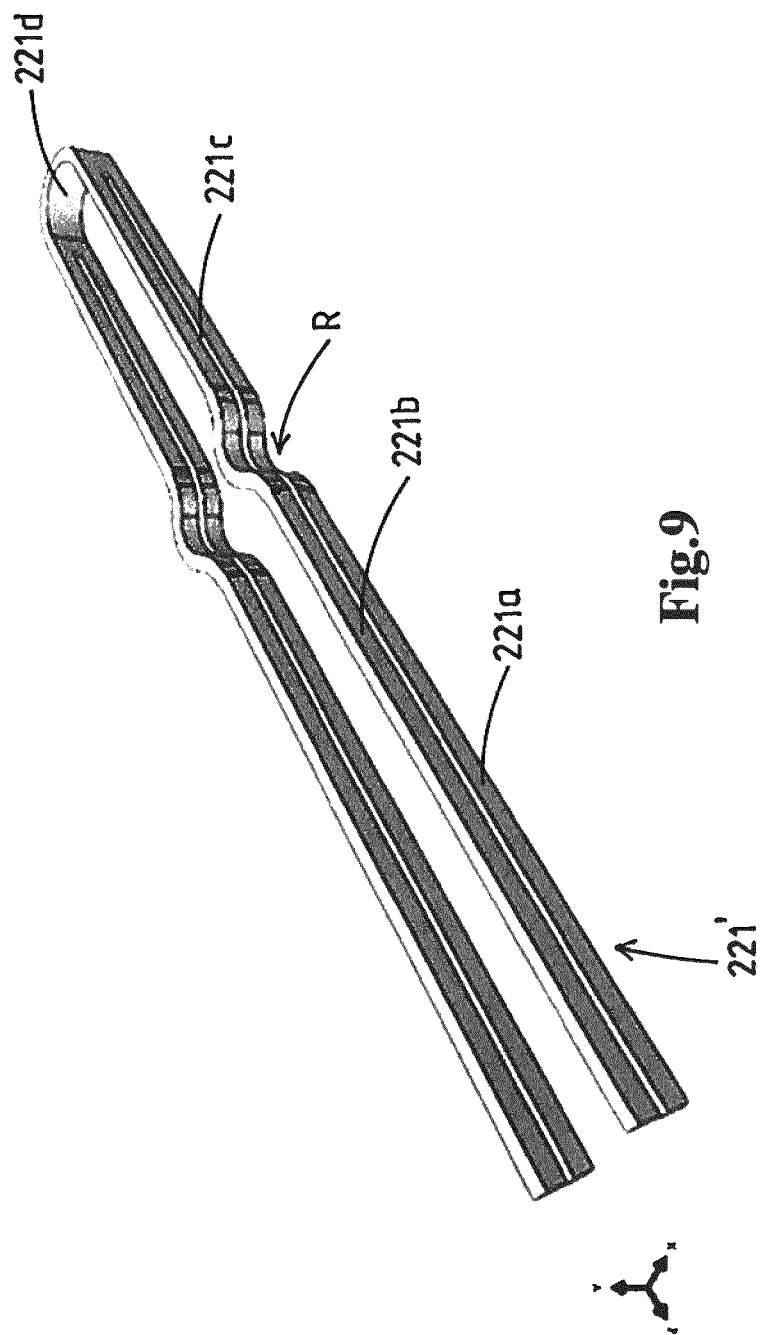

FIG. 9 shows an embodiment, wherein the inductor 221' of a jaw has an inductor element that is generally U-shaped seen from above.

Herein each leg of the U-shape, preferably at least the front leg behind the susceptor element 222, is embodied with multiple elongated inductor sections 221a, b as discussed as well as slit 221c. For reasons of homogeneity of the generated field the other or rear leg is preferably similar to the front leg. The portion 221d now is a curve seen from above.

The shape corresponds to the contoured front surface of the respective jaw when seen in said view from above.

Figure 10:
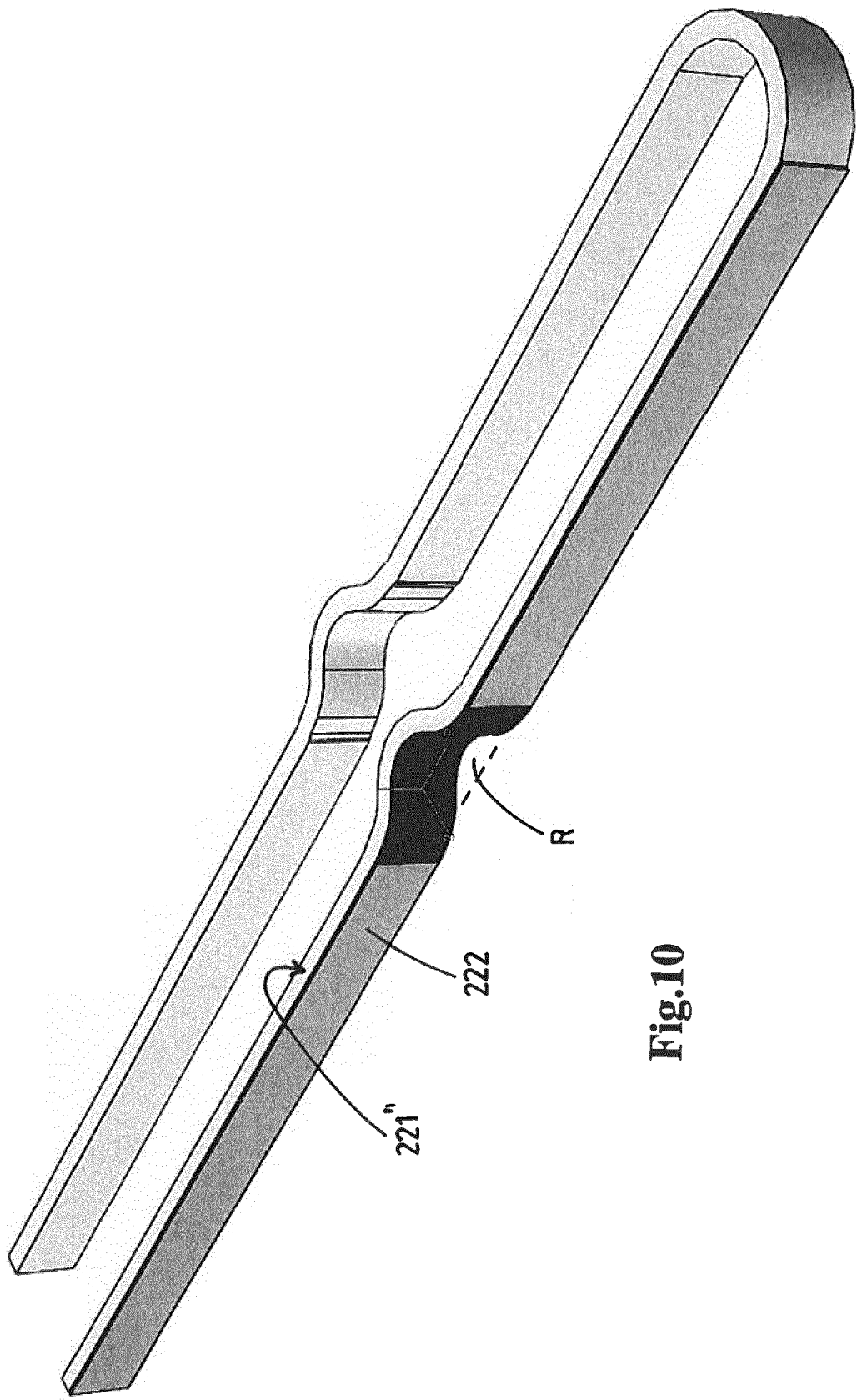

FIG. 10 shows an embodiment, wherein the inductor 221" has a single elongated inductor section behind the susceptor element 222.

FIG. 10 also illustrates that the inductor 221 of a jaw has an inductor element that is generally U-shaped seen from above wherein at least the front leg of the U-shape, preferably both legs as shown, has a shape corresponding to the contoured front surface of the respective jaw when seen in said view from above.

Figure 11:
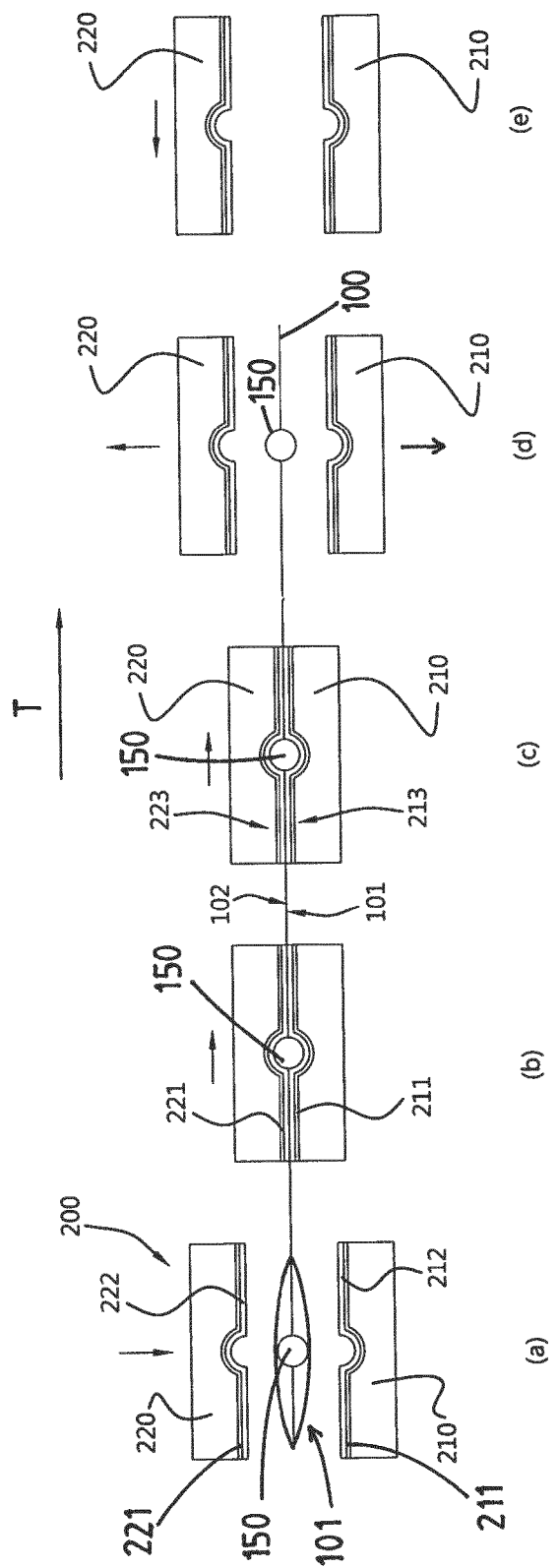

In FIG. 11, the impulse sealing of top edge regions of a first pouch wall 101 and of a second pouch wall 102, with a spout 150 in between them, is displayed schematically by means of steps (a)-(e).

In the displayed embodiment, the sealing device 200 comprises a first jaw 210 and a second jaw 220. During the production of the pouches, the pouch walls 101, 102 are moved continuously in a transportation direction (T), from left to right in FIG. 11. The welding device 200 is configured to move along with the pouch walls 101, 102 in the transportation direction (T), at least during the sealing cycle.

The cycle is started with step (a), shown on the left side of FIG. 11. The first jaw 210 and the second jaw 220 are initially in a position spaced from the pouch walls 101, 102 that are opened in in upper region, with the spout 150 being inserted with its attachment portion in this opened upper region.

Upon operation of the first actuator device 201, the first jaw 210 is moved towards its first contact position, such that the first jaw 210 comes in contact with the first pouch wall 101. Similarly, the second jaw 220 is moved towards its first contact position by the second actuator device 202, such that the second jaw 220 comes in contact with the second pouch wall 102. In the respective contact positions, the first front surface abuts the first pouch wall 101 and the second front surface abuts the second pouch wall 102. Furthermore, the spout 150 is now clamped, lightly as no pressure is involved in the sealing process, in between the first pouch wall 101 and the second pouch wall 102 and within the recesses R.

Next, during step (b), the jaws 210, 220 remain in their respective clamped positions and move along with the pouch walls 101, 102. Step (b) is an impulse sealing step, during which an electromagnetic field is provided in the first inductor 211 and in the second inductor 221, in order to induce respective heat impulses in the first susceptor 212 and in the second susceptor 222.

Under the influence of the heat impulses, the first pouch wall 101 and the second pouch wall 102 are locally fused with each other and with the spout 150 in between them, in order to heat seal the pouch walls 101, 102 to the spout attachment portion 151 and to fuse the pouch walls 101, 102 against each other next to the portion 151.

During step (c), the heat impulses are no longer provided as the inductors are no longer energized, but the jaws 210, 220 remain in their clamped positions. Cooling fluid is being circulated through the ducts 214 in the jaws 210, 220. Preferably, this supply of cooling fluid may be continued during all steps (a)-(e) of the process. Accordingly, heat is removed from the welded pouch 100 as well.

During step (d), the first jaw 210 and the second jaw 220 are moved away from each other, into the opened position. As such, the welded pouch 100 may be taken over by a further handling device, to allow for further processing thereof, such as packaging. Upon moving them away from each other, the jaws 210, 220 again become spaced.

Finally, during step (e), the first jaw 210 and the second jaw 220 are moved back towards their initial position. This movement may take place in a direction opposite to the transportation direction (T), in order to effect that the jaws 210, 220 become arranged in their initial positions, similar as on the onset of step (a).

After moving the jaws 210, 220 back during step (e), the cycle is repeated, starting with step (a) again.

It will be appreciated that the path of the jaws 210, 220 can be of any suitable shape, e.g. circular, oval, linear, etc.

The invention claimed is:

1. A production machine for the production of collapsible pouches having a fitment, said pouches each having walls made from a heat-sealable film material, wherein the production machine comprises a fitment sealing station that is configured to heat seal a plastic fitment having an attachment portion in a non-bonded edge region between opposed first and second walls made from the heat-sealable film material, wherein the non-bonded edge region has a length and a height, wherein the fitment sealing station comprises:
   an impulse sealing device comprising a first jaw and a second jaw,
   an actuator device configured to move the first and second jaws relative to one another between an opened position and a clamped position, and
   a cooling device configured to cool each of the first and second jaws,
   wherein the first jaw has a first contoured front surface configured to contact the edge region of a respective first wall of the pouch,
   wherein the second jaw has a second contoured front surface configured to contact the edge region of a respective second wall of the pouch,
   wherein the first and second contoured front surfaces each have a recessed face portion defining a recess configured to receive therein a half of the attachment portion of the fitment, and wherein the first and second contoured front surfaces each define, on opposite sides of the respective recessed face and adjoining said recessed face, coplanar face portions,
   wherein each of the first and second jaws comprises at the respective contoured front surface thereof at least one elongated, impulse heatable member that extends along the recessed face portion and the coplanar face portions of the respective front surface and that is covered by a heat-resistant non-stick covering,
   wherein the production machine is configured such that, in operation, the fitment is positioned with the attachment portion thereof in the non-bonded edge region, between the opposed first and second walls made from heat-sealable film material, and
   wherein the fitment sealing station is configured to perform an impulse sealing cycle, wherein the actuator device is configured to bring the first and second jaws into the clamped position, so that—in the edge region—the first and second walls are clamped against the attachment portion of the fitment by the recessed faces of the first and second jaws and so that—in the edge region—the first and second walls on opposite sides of the fitment are clamped against one another by the coplanar faces of the first and second jaws, and wherein the fitment sealing station is configured to, in the clamped position, temporarily energize the impulse heatable members so as to generate an impulse of heat that is emitted by each of the impulse heatable members, which impulses of heat seal the edge region of the first and second walls to the attachment portion of the fitment and to each other on opposite sides of the attachment portion, wherein the first and second jaws, at least the impulse heatable members thereof, cool down after termination of the energizing assisted therein by operation of the cooling device, and wherein the actuator device is configured to move the first and second jaws into the opened position after the impulse heatable members have cooled down,
   wherein each impulse heatable member is a susceptor element comprising electrically conductive material, said susceptor element having a rear side facing away from the respective contoured front surface, and
   wherein each of the first and second jaws comprises an inductor which is electrically insulated from the respective susceptor element, wherein the inductor comprises an elongated inductor section that extends along the respective contoured front surface at the rear side of the respective at least one susceptor element, and
   wherein the fitment sealing station comprises a high frequency electric current source, which is connected to the inductor of each of the first and second jaws, and
   wherein the fitment sealing station is configured so that, in the impulse sealing cycle, the electric current source is operated to temporarily feed a high frequency electric current to the inductors, thereby generating a high frequency electromagnetic field with the inductors, wherein the high frequency electromagnetic field induces eddy currents in the respective susceptor element generating an impulse of heat that is emitted by the susceptor element, which impulses of heat seal the edge region of the walls to the attachment portion of the fitment and to each other.

2. The production machine according to claim 1, wherein the at least one elongated inductor section is a solid cross-section metal inductor section, having a constant cross-section over its length along the contoured front surface of the respective jaw.

3. The production machine according to claim 1, wherein the elongated inductor section has, seen in a top view onto the jaw, a shape corresponding to the contoured front surface of the jaw and maintains a uniform distance between the susceptor element and the elongated inductor section.

4. The production machine according to claim 1, wherein the inductor of a jaw comprises multiple elongated inductor sections that are parallel to one another.

5. The production machine according to claim 1, wherein the inductor of a jaw comprises multiple elongated inductor sections that are parallel to one another and vertically spaced from one another by a horizontal slit.

6. The production machine according to claim 5, wherein said slit between neighbouring inductor sections that are arranged above one another has a height between 0.01 and 5 mm.

7. The production machine according to claim 5, wherein the susceptor element, seen in a view onto the front of the jaw, extends over the slit between parallel elongated inductor sections and overlaps in said view with each of the parallel inductor sections.

8. The production machine according to claim 5, wherein the susceptor element is embodied as one strip that extends over the slit between parallel elongated inductor sections and overlaps in said view with each of the parallel inductor section.

9. The production machine according to claim 1, wherein the inductor of a jaw is embodied so that in a pair of adjacent and parallel inductor sections arranged at the rear side of the susceptor element, the current flows in opposite directions through the inductor sections.

10. The production machine according to claim 1, wherein the at least one elongated inductor section has a thickness of between 1.0 and 4.0 mm, seen perpendicular to the front surface of the jaw.

11. The production machine according to claim 1, wherein at least one cooling fluid duct extends along the at least one inductor section that extends along the rear side of the susceptor element.

12. The production machine according to claim 1, wherein the susceptor element is made of metal material.

13. The production machine according to claim 1, wherein the susceptor element is embodied as a strip having opposed front and rear main faces that define the thickness of the strip between them.

14. The production machine according to claim 1, wherein the susceptor element has a thickness of between 0.01 and 5 mm.

15. The production machine according to claim 1, wherein the jaw is provided with a single continuous susceptor element embodied as a strip having a height of the strip between 3 and 10 millimetres.

16. The production machine according to claim 1, wherein the jaw is provided with a resilient backing layer behind the susceptor element, thereby allowing for the jaw front to accommodate for a local variation of the number of film material walls.

17. The production machine according to claim 1, wherein the spacing between the rear of the susceptor element and the neighbouring inductor section(s) is at a minimum 0.025 mm, and at a maximum 3.0 mm.

18. The production machine according to claim 1, wherein the spacing between the front surface of the jaw and the susceptor element is at a minimum 0.025 mm.

19. The production machine according to claim 1, wherein the contoured front surface of the jaw is smooth in a region of contact with the walls of film material, at least in the recessed portion thereof.

20. The production machine according to claim 1, wherein the jaws are configured so that the entire non-bonded edge region in which the fitment is inserted is sealed in one cycle by the operation of the jaws.

21. The production machine according to claim 1, wherein the sealing device is configured to provide a heat impulse with the susceptor element of between at least 150° C. and at most 500° C. measured on the susceptor element.

22. The production machine according to claim 1, wherein the heat impulse duration lies between 10 and 1000 milliseconds.

23. The production machine according to claim 1, wherein the cycle includes a clamped cooling phase directly following the heat impulse during which the jaws are maintained in clamped position.

24. The production machine according to claim 1, wherein the production machine comprises a conveyance mechanism that is configured to convey individual pouches or a string of interconnected pouches along a path of conveyance in a continuous motion, said path at least extending along the fitment sealing station, and wherein the sealing station comprises a motion device that is configured to move the first and second jaws in synchronicity with the continuously moving pouch or string of pouches during the impulse sealing cycle.

\* \* \* \* \*